(12) United States Patent
Yaman

(10) Patent No.: US 10,949,578 B1
(45) Date of Patent: Mar. 16, 2021

(54) SOFTWARE CONCEPT TO DIGITALLY TRY ANY OBJECT ON ANY ENVIRONMENT

(71) Applicant: Pinar Yaman, Lewis Center, OH (US)

(72) Inventor: Pinar Yaman, Lewis Center, OH (US)

( * ) Notice: Subject to any disclaimer, the term of this patent is extended or adjusted under 35 U.S.C. 154(b) by 0 days.

(21) Appl. No.: 16/038,182

(22) Filed: Jul. 18, 2018

Related U.S. Application Data

(60) Provisional application No. 62/533,667, filed on Jul. 18, 2017.

(51) Int. Cl.
*G06F 30/13* (2020.01)
*G06T 19/20* (2011.01)

(52) U.S. Cl.
CPC .............. *G06F 30/13* (2020.01); *G06T 19/20* (2013.01); *G06T 2219/2004* (2013.01); *G06T 2219/2016* (2013.01)

(58) Field of Classification Search
CPC .. G06F 17/50; G06F 17/5004; G06F 17/5009; G06F 30/13; G06Q 30/0601; G06Q 30/0621; G06Q 30/0631; G06Q 30/0643; G06T 19/20; G06T 19/006; G06T 2210/04
See application file for complete search history.

(56) References Cited

U.S. PATENT DOCUMENTS

| | | | | |
|---|---|---|---|---|
| 6,727,925 B1 * | 4/2004 | Bourdelais | ............... | G06T 19/00 715/850 |
| 7,062,722 B1 * | 6/2006 | Carlin | .................... | G06Q 30/02 715/781 |
| 7,277,572 B2 * | 10/2007 | MacInnes | ............... | G06F 30/13 382/154 |
| 9,129,404 B1 * | 9/2015 | Wagner | ............... | G06Q 30/0643 |
| 9,418,378 B2 * | 8/2016 | Staicut | ............... | G06Q 30/0643 |
| 9,420,253 B2 * | 8/2016 | Baker | ....................... | G06T 15/50 |
| 9,922,437 B1 * | 3/2018 | Baron | ..................... | G06T 11/60 |
| 9,940,751 B1 * | 4/2018 | Wagner | ..................... | G06T 3/40 |
| 9,965,793 B1 * | 5/2018 | Hasan | ................... | G06F 16/951 |
| 9,965,800 B1 * | 5/2018 | Pitstick | ............. | G06Q 30/0643 |
| 9,971,853 B2 * | 5/2018 | Jovanovic | .............. | G06T 15/20 |
| 9,977,844 B2 * | 5/2018 | Jovanovic | .............. | G06T 15/20 |
| 10,002,208 B2 * | 6/2018 | Jovanovic | .............. | G06T 15/20 |
| 10,049,493 B1 * | 8/2018 | Verizzo | ..................... | G06F 3/011 |
| 10,102,657 B2 * | 10/2018 | Huang | ..................... | G06T 15/00 |
| 10,102,673 B2 * | 10/2018 | Eraker | .................. | G06T 19/003 |
| 10,109,051 B1 * | 10/2018 | Natesh | ................. | G06K 9/4652 |
| 10,296,663 B2 * | 5/2019 | Jovanovic | .............. | G06T 15/20 |
| 10,319,150 B1 * | 6/2019 | Canada | ................. | G06T 19/006 |
| 10,395,435 B2 * | 8/2019 | Powers | .................. | G06T 15/10 |

(Continued)

FOREIGN PATENT DOCUMENTS

DE     102005048926 A1 *   7/2006   ............. G06Q 10/10

*Primary Examiner* — John Villecco

(57) ABSTRACT

Present invention has brought practically a unique software concept which has a purpose of creating an interactive digital trying experience of any object in any environment without getting help of another software. Present invention can accomplish this by combining two main features which are creating an object pattern/patterns automatically (as per user/client requirements) and completing by the confirmation of user/users then applying these created object pattern/patterns to an environment image/images automatically with the confirmation of a user/users all in one software concept.

2 Claims, 24 Drawing Sheets

(56) References Cited

U.S. PATENT DOCUMENTS

| | | | | |
|---|---|---|---|---|
| 2001/0047250 A1* | 11/2001 | Schuller | | G06F 17/5004 703/1 |
| 2005/0081161 A1* | 4/2005 | MacInnes | | G06K 9/00 715/765 |
| 2006/0277119 A1* | 12/2006 | Tung | | G06Q 30/06 705/26.2 |
| 2007/0143082 A1* | 6/2007 | Degnan | | G06T 11/60 703/1 |
| 2007/0237424 A1* | 10/2007 | Burg | | G06T 11/60 382/286 |
| 2008/0071559 A1* | 3/2008 | Arrasvuori | | G06T 19/006 705/26.1 |
| 2008/0103908 A1* | 5/2008 | Munk | | G06Q 30/02 705/14.72 |
| 2011/0029401 A1* | 2/2011 | Granger | | G06Q 30/00 705/26.4 |
| 2011/0071805 A1* | 3/2011 | Pendyala | | G06F 17/5004 703/1 |
| 2012/0120113 A1* | 5/2012 | Hueso | | G06T 19/006 345/672 |
| 2012/0194555 A1* | 8/2012 | Byrnes | | G06F 30/13 345/634 |
| 2013/0282527 A1* | 10/2013 | Mannik | | G06Q 30/0257 705/26.61 |
| 2013/0335414 A1* | 12/2013 | Jovanovic | | G06T 19/006 345/420 |
| 2014/0132595 A1* | 5/2014 | Boulanger | | G06T 19/20 345/419 |
| 2014/0132633 A1* | 5/2014 | Fekete | | G06T 11/60 345/634 |
| 2014/0253553 A1* | 9/2014 | Jovanovic | | G06F 3/04883 345/427 |
| 2014/0279242 A1* | 9/2014 | Staicut | | G06Q 30/0643 705/26.61 |
| 2015/0186743 A1* | 7/2015 | Karnos | | G06K 9/6202 382/195 |
| 2015/0325038 A1* | 11/2015 | Baker | | G06Q 30/0643 345/426 |
| 2015/0363943 A1* | 12/2015 | Yalniz | | G06T 7/90 345/591 |
| 2016/0063600 A1* | 3/2016 | Wuang | | G06Q 30/0631 705/26.7 |
| 2016/0104235 A1* | 4/2016 | Benkar | | G06F 3/14 705/27.2 |
| 2016/0378887 A1* | 12/2016 | Maldonado | | G06Q 30/0635 705/26.81 |
| 2017/0078648 A1* | 3/2017 | Saunders | | H04N 13/246 |
| 2017/0323488 A1* | 11/2017 | Mott | | G06F 3/002 |
| 2018/0005456 A1* | 1/2018 | Vijayaraghavan | | G06F 16/51 |
| 2018/0173401 A1* | 6/2018 | Kim | | H04M 1/725 |
| 2018/0260988 A1* | 9/2018 | Huang | | G06F 30/20 |
| 2018/0285354 A1* | 10/2018 | Minami | | G06Q 10/0837 |
| 2019/0066389 A1* | 2/2019 | Jacobson | | G06T 19/20 |
| 2019/0197599 A1* | 6/2019 | Zia | | G06Q 30/0643 |
| 2019/0279283 A1* | 9/2019 | Benkar | | G06Q 30/0643 |
| 2019/0289199 A1* | 9/2019 | Piramuthu | | G06Q 30/0643 |
| 2019/0295151 A1* | 9/2019 | Ghadar | | G06F 16/9038 |
| 2019/0325498 A1* | 10/2019 | Clark | | G06K 7/1417 |
| 2020/0105066 A1* | 4/2020 | Yip | | G06T 15/005 |

* cited by examiner

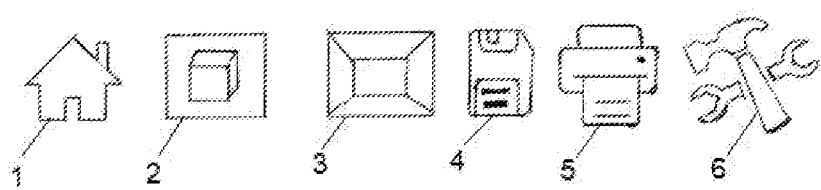
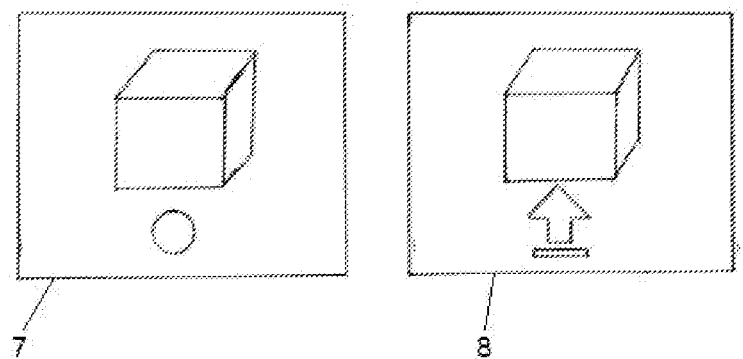
Fig. 1

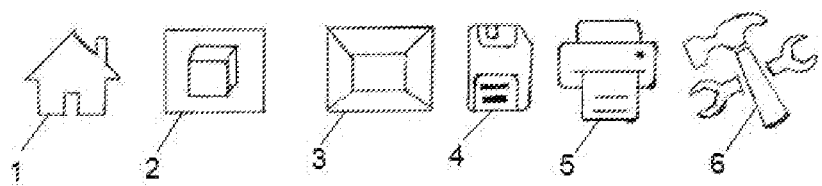
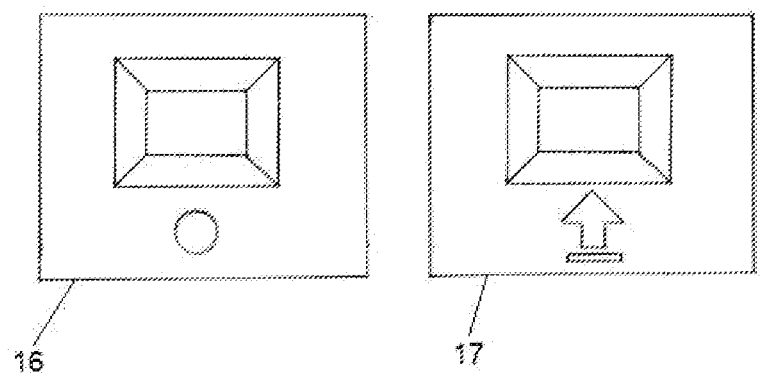
Fig. 4

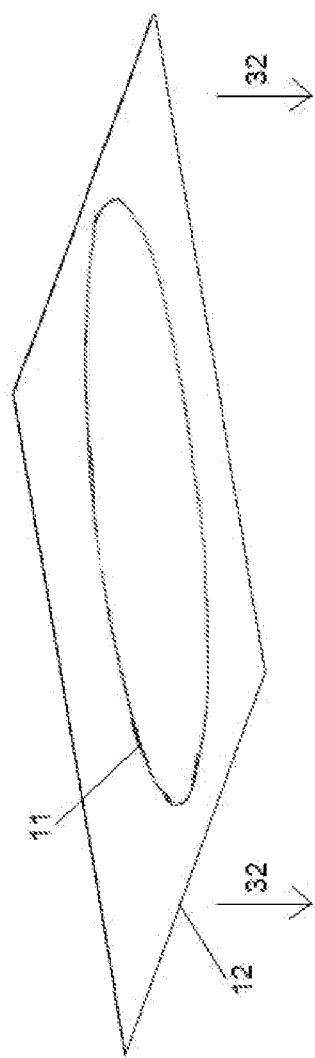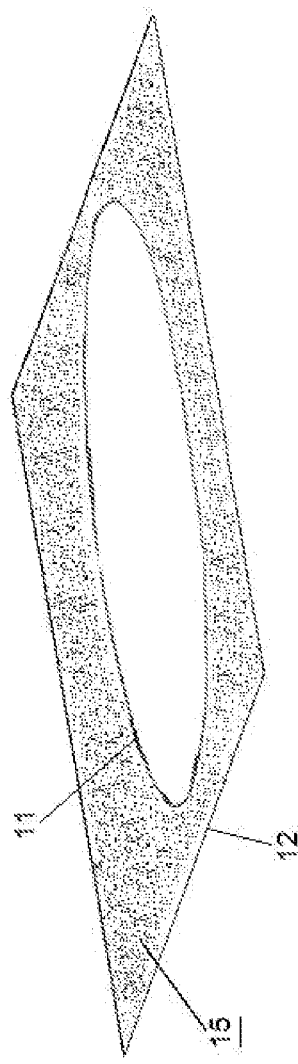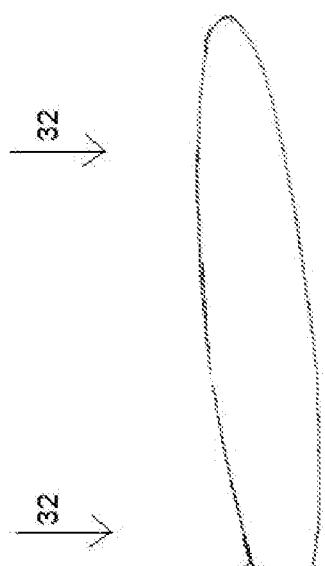

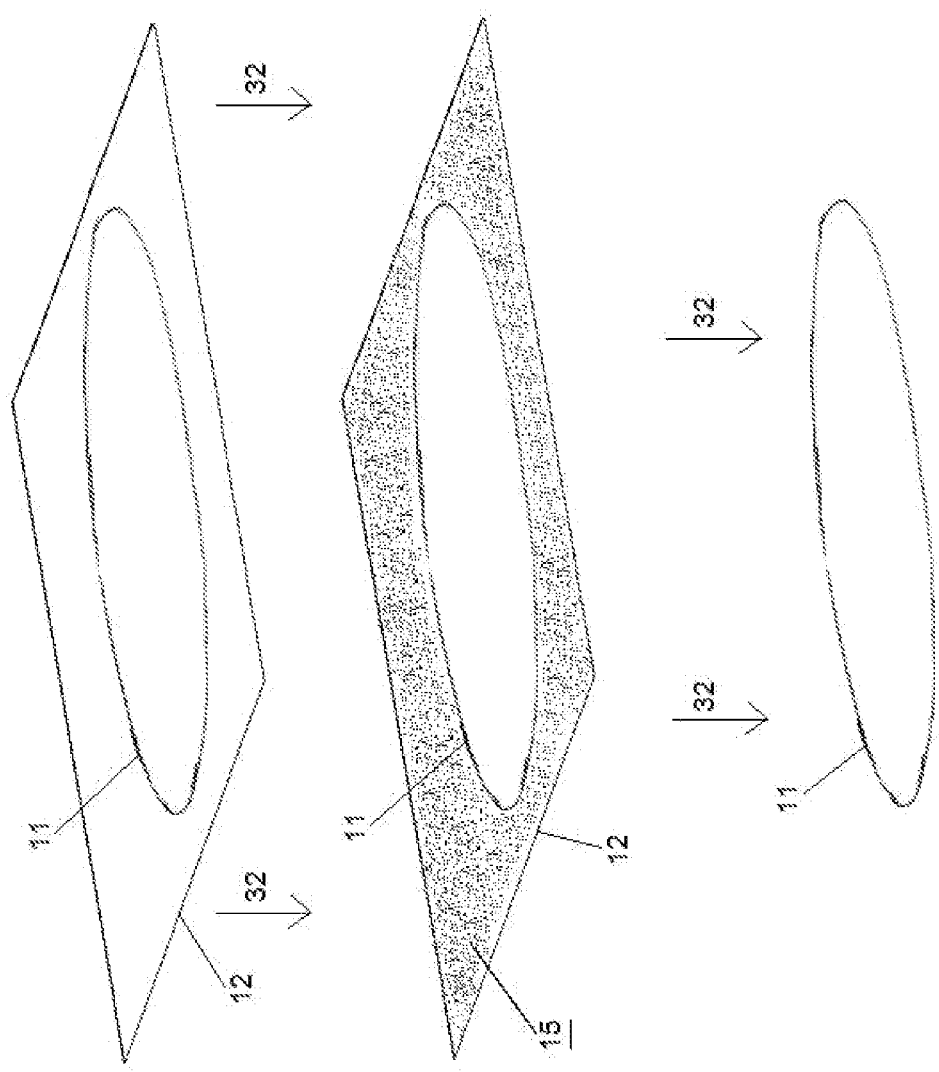

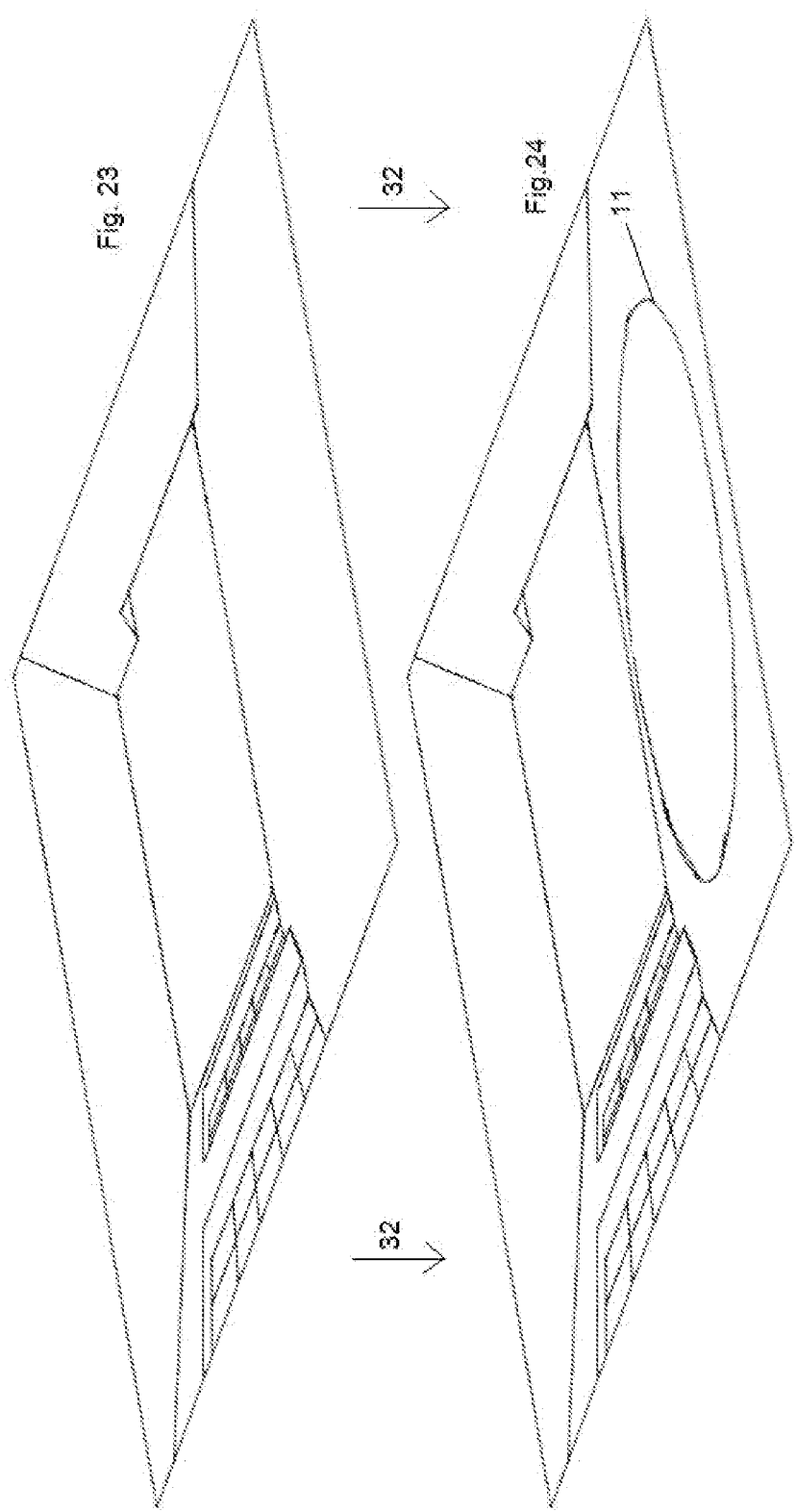

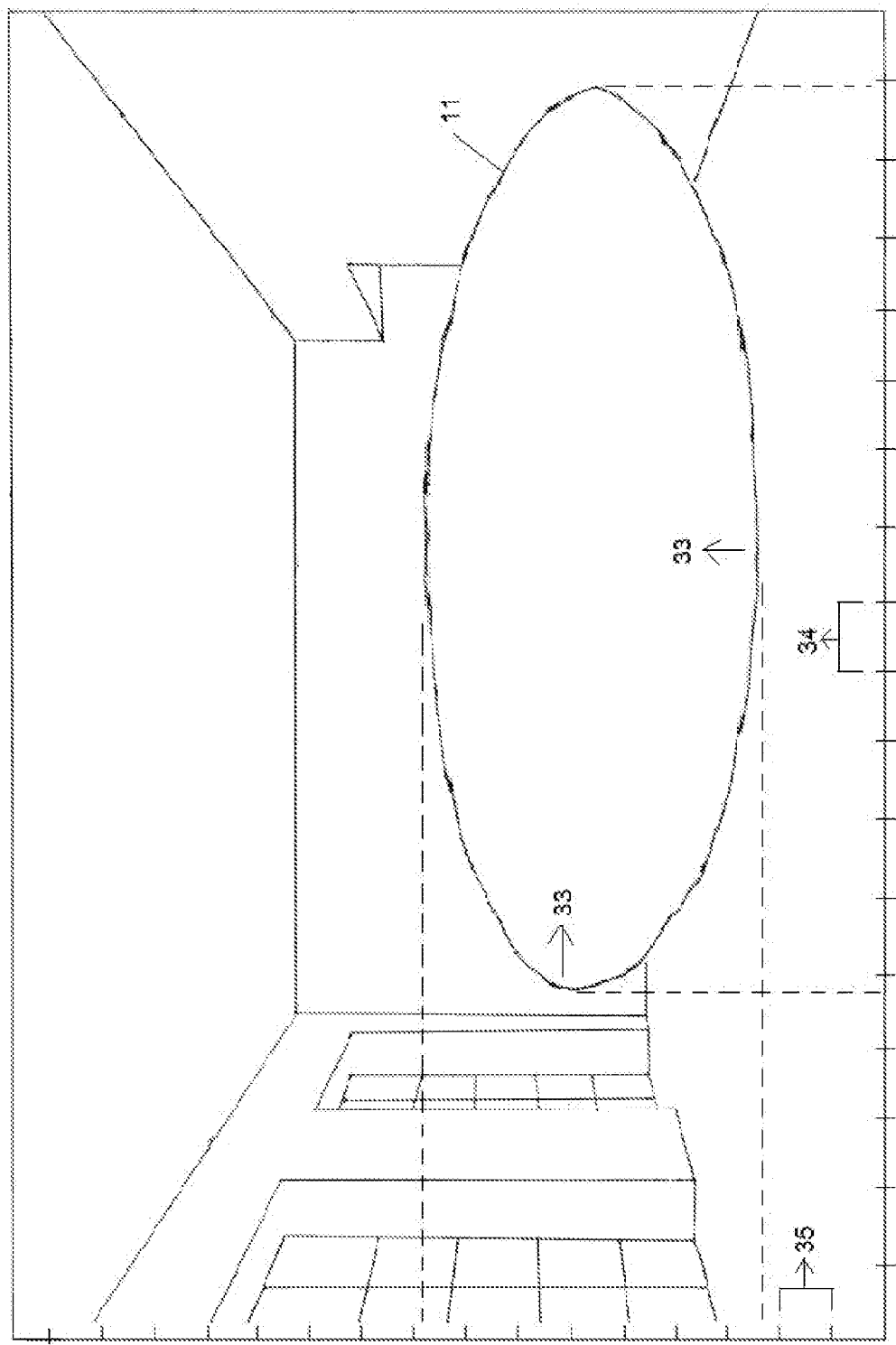

SOFTWARE CONCEPT TO DIGITALLY TRY ANY OBJECT ON ANY ENVIRONMENT

CROSS-REFERENCE TO RELATED APPLICATIONS

This application is a non-provisional patent application of a provisional application No. 62/533,667 which has been submitted on Jul. 18, 2017 through USPTO electronic filling.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of an Information Technology. More particularly, the present invention is in the technical field of the software concept which lets users to try any object on any chosen environment digitally to be able see how chosen objects will look like in a chosen environment.

There will be a terminology inside of this paperwork and it will mean as it is explained in the following descriptions. In this entire paperwork "object image" will refer to a picture/image that contains wanted/chosen object/item/product that user would like to try digitally. "Environment image" will refer to a picture/image which is a picture/image of the environment that user would like to see a wanted/chosen object/item/product on this "environment image". "Object pattern" will refer to a processed shape of an "object image" (how it will look like, will be shown on drawings and will be explained inside of this specification) which is the image of only a wanted object/item/product but nothing else.

There has been found some digital trying applications which let users to try some objects on environment images. These type of applications has been found while searching if there is any software concept available as the present invention. Prior art of invention which has been found, has some objects (seems like object patterns) which are already uploaded into this type of software by developer and saved inside of these applications for users to digitally try these object patterns. These few applications allows users to try only objects patterns which are already exist inside of the application and as they have been reviewed, they do not allow users to try any other object/objects (user may want to try any object other than what is available in the application). That is why these few applications may not be compared with the present invention because these type of applications does not have technology/functionality to allow users to try any object image in any environment. These few applications has only some object patterns inside of these applications which has been chosen and prepared by the creator of the application/software and users of these type of applications can only try objects which are available inside of these applications. It means that every time, if users of these prior art of invention demand to try a different object (other than what is already saved inside by developer) then creator or developer of these applications should prepare the object pattern in another software (outside of their own application/software) then upload and add these object pattern/patterns inside of their applications (prior art of invention) to make it useful for the user. These type of digital trying software model/concept has been found so limited. (These applications have been searched and found by me when I was looking to find out if any software concept exist like the present invention and the prior art of invention that I mentioned above, have been found in social media channels—reality of these applications are unknown, they may have been even just a project or project design) (This search have been made before applying a provisional application of this non-provisional application which was before Jul. 18, 2017). Also data base of USPTO has been searched by the inventor of the present invention to find out if there is any prior art or similar invention/inventions exists. As per the knowledge of the inventor, search has been done by entering different key words to the data base such as "digital try", "digital trying software" and so on, nothing related or similar patent has been found.

If we go back to comparison of applications that has been found through social media channels, because of the way a prior art of invention have been built, users were not able to try anything and everything they want to try other than what exists inside of the application. The way these applications/software's function is almost same as digital "clothing games" which were existed long time back. Basically the way these "clothing games" works was, there was a body model (most of the time an image of a carton body) and available dress patterns, clothing patterns (object patterns) which could be tried by applying (merging) these dress patterns (object patterns) on a body model/models (both object patterns and body model image was ready, saved inside of these games by developer, users were only merging dresses/clothing's with the body model in these applications). I strongly believe that users need much more flexible and functional software concept which can allow users to be more flexible and carry digitally trying experience to another level. The prior art of digital trying applications need a new version that can be used to try any wanted object on any environment. When users want, they should be able to upload any object image to the present invention or take directly picture of the object through the present invention and the present invention should be capable to process these object images to generate object pattern/patterns by giving importance to users choices then apply this generated object pattern or patterns to any environment image in a way users want to try objects more interactive way. This trying experience can be on an image or more dynamic environment like while a making video (all of these different options have a potential to be different versions of the present invention by using same technology).

I believe, it is also important to mention that the prior art of invention as I mentioned above in this section has been found before submitting a provisional application (on Jul. 18, 2017) of this non-provisional application. After I had submitted a provisional application of "Software concept to digitally try any object on any environment", as per my search on the internet somewhere in October 2017 (falls after a filling date of provisional application of this non-provisional application) Microsoft released their Windows 10 Fall Creators Update which includes a feature called "mixed reality" and I believe as a concept it was almost same as what I came up with as style and functionality. Previous versions of Microsoft products such as Power Point, Paint had a back ground removal function but not "mixed reality". In case if it is needed by USPTO, I do have also proof of documents which shows that I created this software concept before submitting a provisional application No. 62/533,667 of this present invention.

BRIEF SUMMARY OF THE INVENTION

The present invention is a software concept which has many functions and processing steps. Some of these functions are main functions of the software concept to allow users to try any object in any environment digitally and some part of functions are helpful tools to make the present invention more user friendly and interactive. Processing object images in a way to create an object pattern and applying these object patterns to an environment image for users to experience of trying any wanted object/objects on any chosen environment image is the main function of the present invention. An object image and an environment image are both can be chosen by users without limitation and most important part is, none of these object images or environment images are ready inside of the present invention, users of the present invention will have a freedom to upload any environment image, object image or take a picture of an object image, environment image directly through the present invention and the present invention will process these object images to create an object pattern/patterns. to apply them on an environment image/images. In different versions of the present invention, a user might be a client such as an online store which will have the right to access to the present invention and accordingly their users will have an access to use the present invention based on a client requirements or based on a version of the present invention a user might be individuals who will have direct access to the present invention.

To explain how the present invention functions, we can say that when users will experience the present invention (software concept), they need to think what they want to try digitally and this object can be a sofa, furniture, appliance, purse, new door, etc. anything that users have seen the image of an object in any website or have seen these actual objects in a store or somewhere another that user wants to try any wanted object digitally and see how this object looks like in a wanted environment. An environment can be a living room of user or garden of user or any environment that user wants to see a chosen object or objects in it. Users can take a picture of a wanted object directly through the present invention or upload an image of the object from their library, from their computer files to the present invention. We will name the image which includes an object that a user wants to try in our software "object image" (below this line "software" will mean only "the present invention"). In similar way users will be able to take a picture of the environment that they want to try an "object image" on this environment or upload this "environment image" to the present invention. We will name the picture of a chosen environment as "environment image". The present invention/the software concept can have different versions like for example some versions of this software may allow to take pictures of object images directly and some versions may not allow this tool to target different users in different versions so basically by using same software concept and technology, there might be different versions (for different type of users and clients, different versions). In same way, some versions of the present invention can allow users to upload both an object and an environment image to the present invention, some versions may not allow users to upload these images but allow users to take object and environment images directly through the present invention.

If we explain briefly, work principle step by step of the software concept (the present invention) (work/processing flow might be in different order based on the version of software) first we may mention, choosing an object image that user wants to try and when user choose the object image by uploading or taking picture of the wanted object directly through a present invention, the software will recognize this image as an "object image" (it will be explained in details, software recognizes the type of images because of the buttons that users clicked) and will start to process this object image to create an "object pattern" till only an object become visible but nothing else (rest of the area will have slightly transparent coloring and the software will let user to verify/confirm if everything looks okay). To make things a bit clear in mind, as we know any picture/image which has been taken, even if we focus on one object, this image will have an area which is not only a pattern of the focused object (this matter will be clear with drawings) but an area around this focused/wanted object that is why the present invention needs to create a pattern which includes only wanted object pattern by verifying/confirming with users. For example when a user takes an image of a sofa and even though in reality user removes any other object around of sofa before taking a picture, still wall behind this sofa will be on this taken object image and it will be visible as a surrounding area of this sofa that is why the present invention will let user to choose wanted areas from a taken object image and in a similar way, user will be able to remove areas which user does not want to see as a part of object image. If processed object pattern is correctly created by the software in a way user wants to see, user will confirm (by using related button, will be shown on drawings) and the present invention will recognize this processed image as an "object pattern". In this way, user becomes more independent to select the object they want to try and remove objects which user does not want to see (we may name these objects as unwanted objects) or unwanted areas surrounding this object such as a wall.

Next step is to take a picture of an environment image (directly through the present invention) or upload an environment image to the present invention (from files, library of the user as user will choose) and that leads the software recognize (in the software it happens in a way by assigning a "value" to each and every chosen image) this image as an environment image that user wants to see the processed object image (object pattern) on this environment image. At this step, the software only recognize this image as an environment image and locate this image in a way it should display in a maintenance window of the software that user can work on to display and move object/objects on this environment image.

After the software recognize related data regarding to an object pattern and an environment image, software will display a result image which will be in a maintenance window as it has been mentioned.

The result image is the image of merged environment image and processed object image (object pattern).

Instantly digital trying experience of any wanted object image in any environment image makes the software so unique and it becomes reality because of the functionality of the software of creating object patterns without needing any another application or software and then applying them to an environment image. This software is like a work space of users to try what they want, it means that they can try for shopping, they can try to design something or somewhere (such as house design), they can try to use for projection of the construction, and etc. Users can choose completely an empty living room (which is an environment image) where user wants to decorate this living room with objects like sofa, carpet, furniture. Before going through a hassle of purchasing, logistics and doing assembly of these wanted objects, user will be able to try these wanted object/objects in their living room digitally and they will be able to see how these objects may look like in their living room before purchasing these objects.

Till here, the work principles of the present invention has been mentioned as main structure of the present invention. Other than explained main function, the present invention will have additional features which one of them will allow users to rotate the object pattern after it has been placed (merged) in an environment image so in this way user will be able to see the chosen object from specified angle as they needed (this is completely optional for user to choose these functions if they want to rotate-basically a rotation feature will be available if it is needed by client). Also if user wants, the present invention will give flexibility to allow displaying the result image (final image which shows how the object looks like in the chosen environment) from different angle by rotating the result image. So basically for rotating two different option will be available first one is rotating an object pattern in maintenance window and second one is rotating a result image of a maintenance window.

Another feature of the present invention is to be able to show the measurement of taken images directly from the present invention through build in camera. With the help of this feature, the software will be able to recognize the real measurement of the chosen object and an environment measurement to show actual display size of the wanted object inside of a wanted environment. If user upload an image (wanted environment or object) which is already exist in users library or files in their computer, then users will be able to enter measurement values to the software (in case if built in camera of the software not used). Then based on the measurement values, the present invention will be able to show the wanted object in a wanted environment as per their size.

All of these features might be in one version or in different versions. Actual work mechanism of the present invention and what makes the present invention "an invention" to enable trying any object digitally in any environment as the main functions has been explained in detail and will be shown on drawings to understand the way to create digital object patterns and applying them to the environment image/ images or interactive video (in case demanded by clients). Around this main functionality of the present invention, helpful features can be edited to improve and make the present invention more user friendly based on client request, requirements.

BRIEF DESCRIPTION OF THE DRAWINGS

FIG. 1 is a view of a page of the present invention which allows to upload or take a picture of a wanted object;

This figure shows a page that user will be able to make a selection between uploading wanted object image or taking a picture (directly through/inside software) of wanted object to try on a wanted environment image.

In this figure we can see different buttons at the top of this page which will lead users to different pages of the software. At the center of this page, there are two buttons which gives option to either upload wanted object image or take directly a picture of the wanted object through the software.

Every parts of the FIG. 1 which are numbered defined as below;

1: main page button (access button to the home page which will have tutorials for users to understand how a present invention functions and saved maintenance windows from previous works of the user that he/she can access when wanted)

2: object image button (brings users to a page for an object image uploading or taking an object image/picture through the software)

3: environment image button (brings users to a page for an environment image uploading or taking an object image/ picture through the software)

4: save button

5: print button

6: maintenance page button (will be an access to the maintenance window which is a digital trying page, in process that user works on)

7: object image camera button

8: object image upload button

Figure 2:
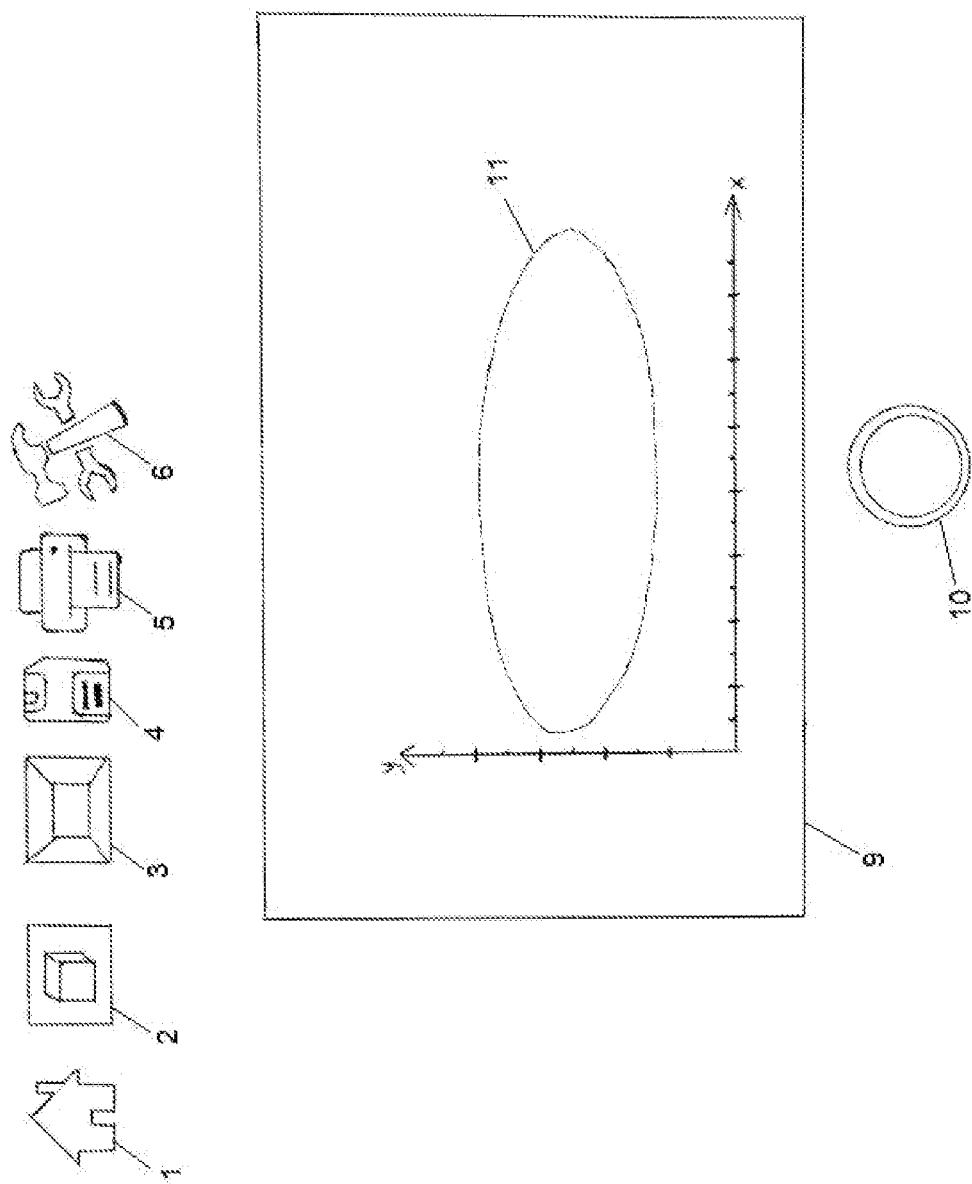

FIG. 2 is a view of a page of the present invention which shows a built-in camera feature for users to take a picture of a wanted object.

This figure shows the page view of the software while taking a picture of a carpet (wanted object to try on an environment (will be chosen in following drawings)).

Every parts of the FIG. 2 which are numbered defined as below;

1: main page button (access button to the home page which will have tutorials for users to understand how a present invention functions and saved maintenance windows from previous works of the user that he/she can access when wanted)

2: object image button

3: environment image button

4: save button

5: print button

6: maintenance page button (will be an access to the maintenance window which is a digital trying page, in process that user works on)

9: camera window (which has built in measurement display inside)

10: camera button to take a picture through the software

11: first object (carpet)

Figure 3:
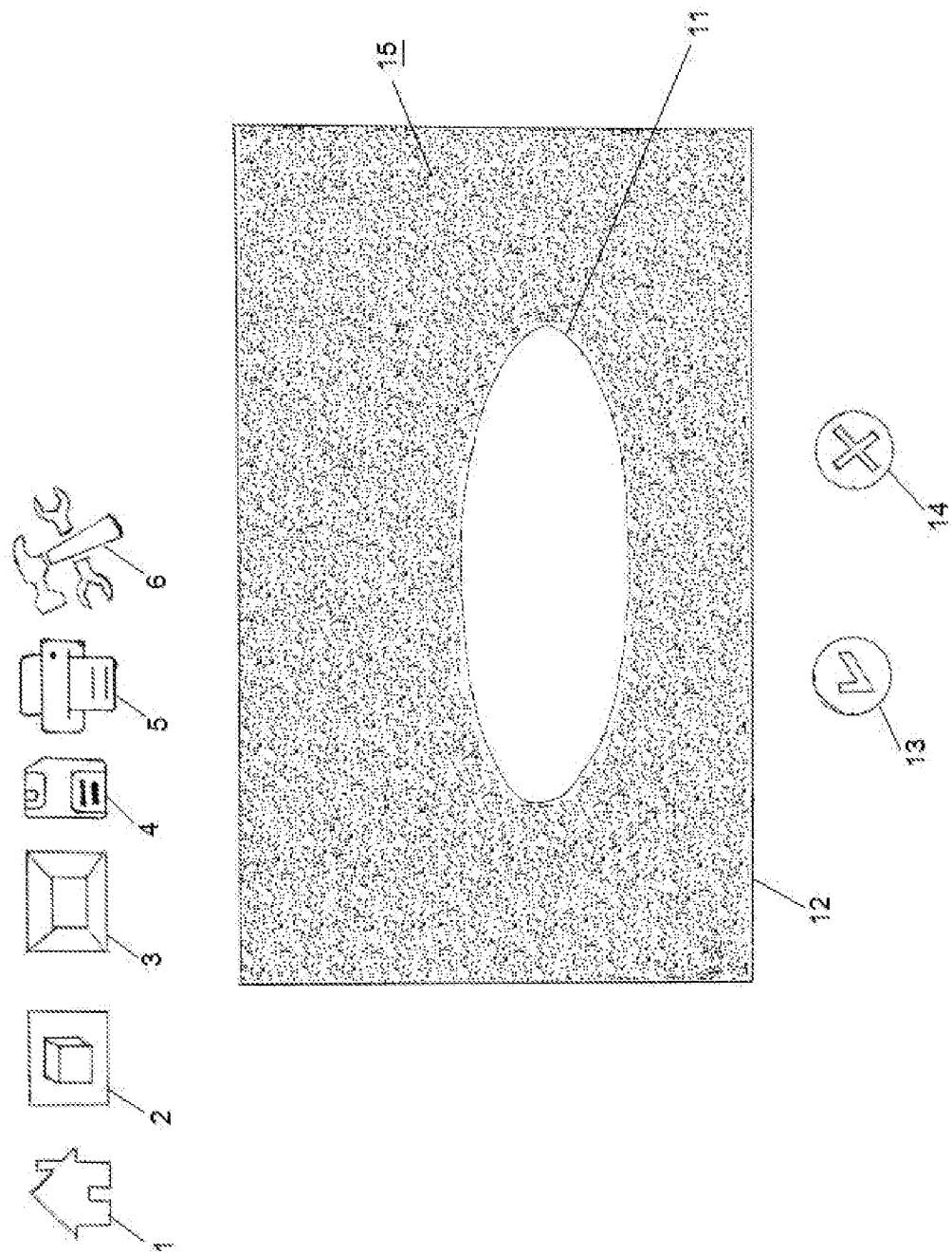

FIG. 3 is a view of a page of the present invention which shows an object image which has been automatically processed by the software.

This figure shows the page view of the software while software processing the taken object image from FIG. 2. To create an object pattern.

Every parts of the FIG. 3 which are numbered defined as below;

1: main page button (access button to the home page which will have tutorials for users to understand how a present invention functions and saved maintenance windows from previous works of the user that he/she can access when wanted)

2: object image button

3: environment image button

4: save button

5: print button

6: maintenance page button (will be an access to the maintenance window which is a digital trying page, in process that user works on)

12: object image display window

13: confirmation button

14: rejection button

15: unwanted areas on an object image (this area become a transparent color during processing that is why shown with shade on this specification)

Button 1, 2, 3, 4, 5, 6 is in many drawings after this section and won't be repeated since it will refer to the same description in all drawings. In same way, other reference characters which are repeated in many drawings, will be described only one time.

FIG. 4 is a view of a page of the present invention to make a selection between uploading or taking a picture of a wanted environment image;

This figure shows a page that user will be able to make a selection between uploading a wanted environment image or taking a picture (directly through the software) of a wanted environment to try wanted object or objects (next steps) on this environment image.

At the center of this page, there are two buttons which gives option to either upload a wanted environment image or take a direct picture of the wanted environment directly through the software.

Figure 5:
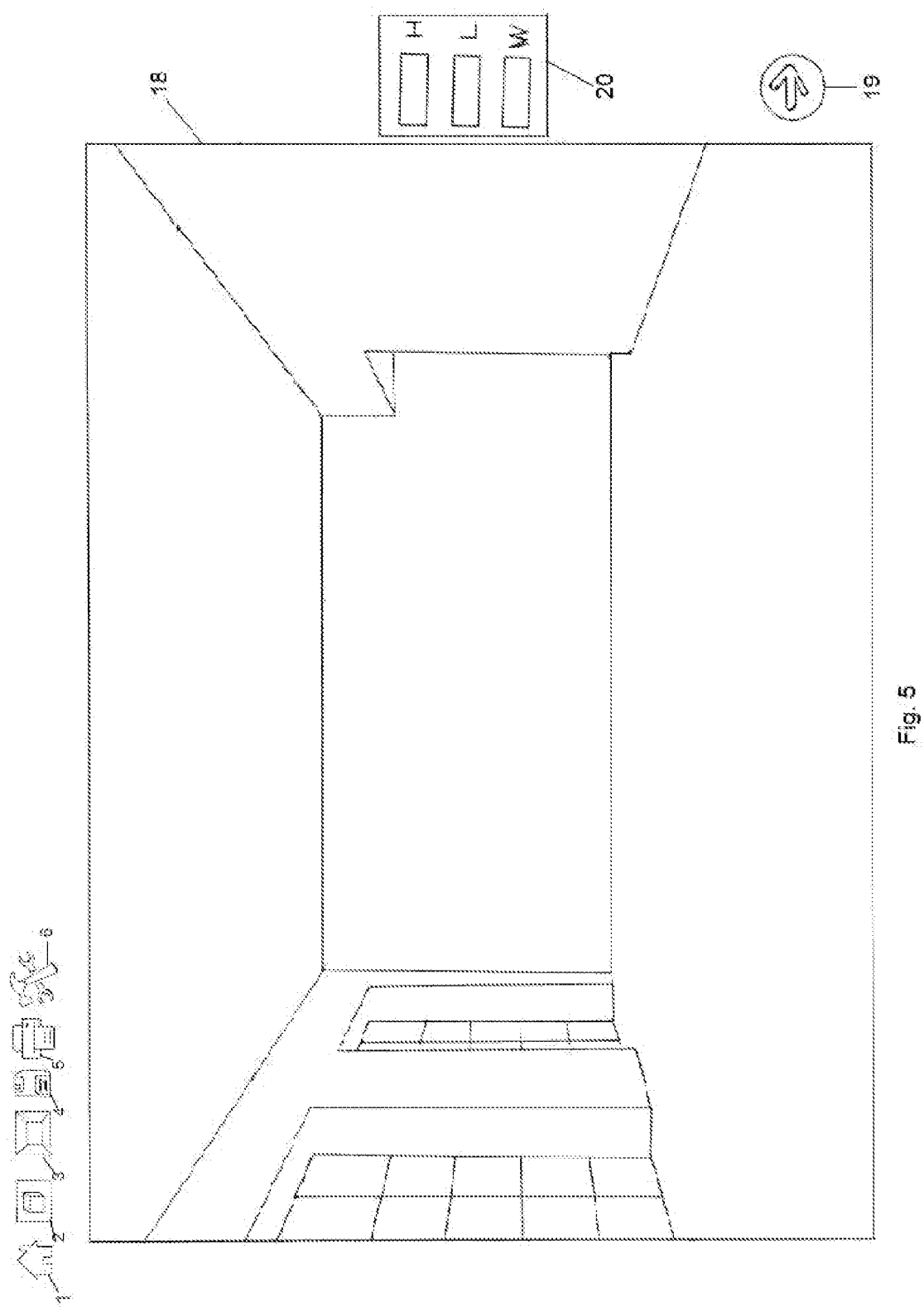

Every parts of the FIG. 4 which are numbered defined as below;
16: a button to take a picture of the environment image
17: a button to upload the environment image to the software FIG. 5 is a view of a page of the present invention which shows a maintenance window which is basically displays an environment image at the first that a wanted object or objects will be tried on it in following steps.

This figure shows a page view of the software where user will work on wanted environment image that they can try wanted object pattern or objects patterns which are created by the software. Also for uploaded environment images, there is a chart which users can enter a data for an environment image.

Every parts of the FIG. 5 which are numbered defined as below;
18: maintenance window
19: next button to confirm and start to try chosen object
20: environment image measurement data entry table (H for height, L for length and W for width)

Figure 6:
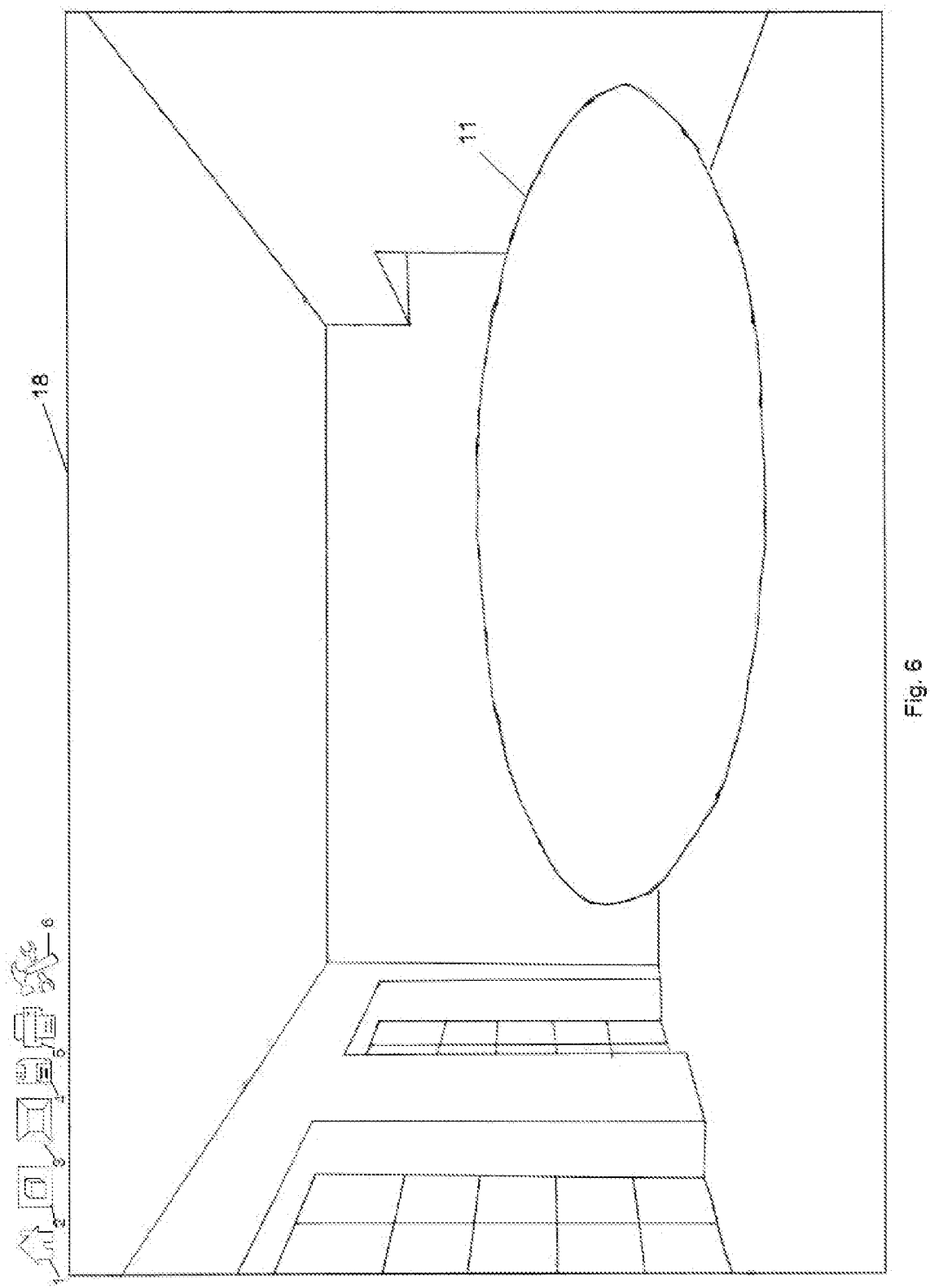

FIG. 6 is a view of a maintenance page of the software that a user starts to try a first object pattern which has been created by the software in previous steps, from first object image (image of wanted carpet).

This figure shows the page view of the software when software drops the first created object pattern (carpet).

Figure 7:
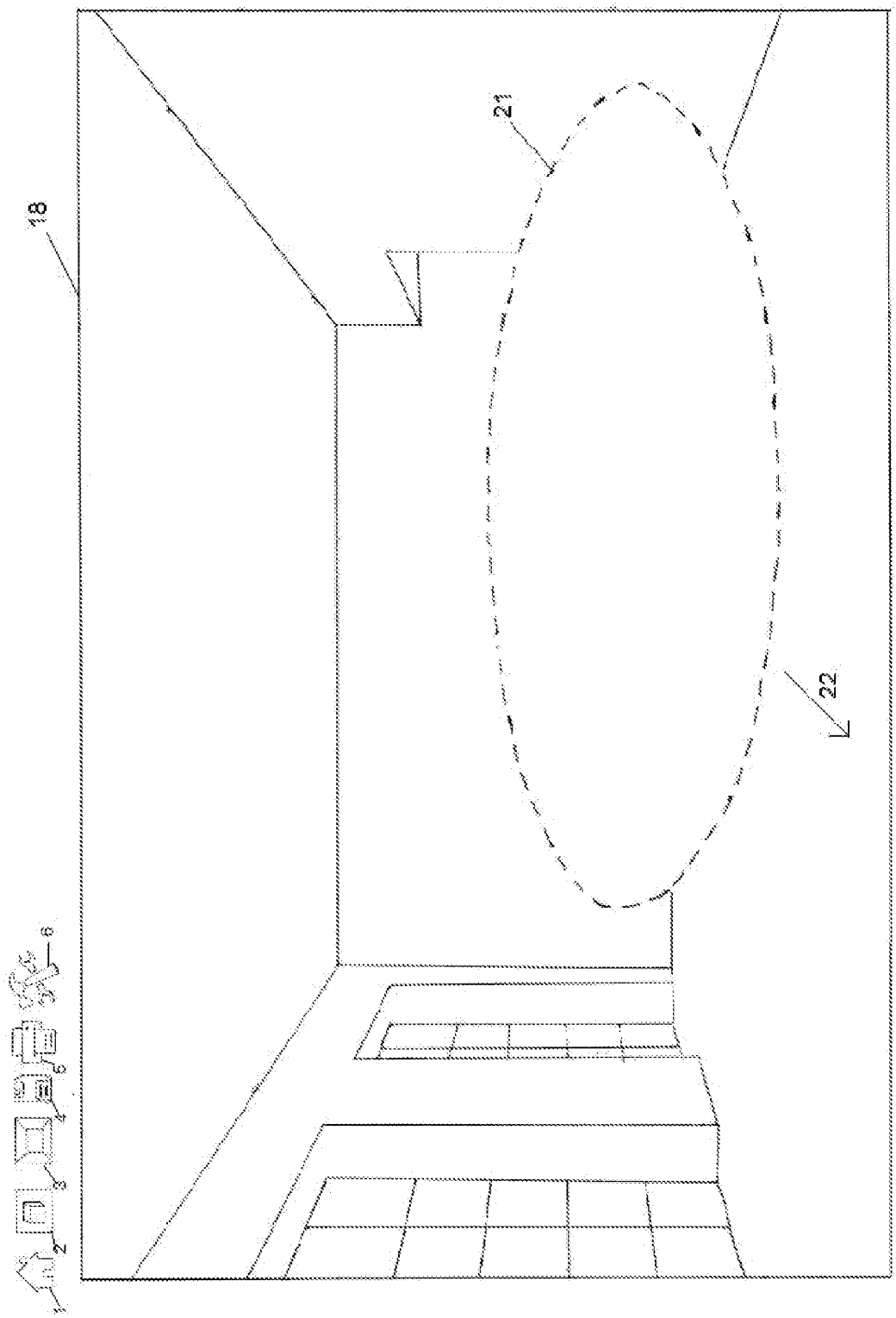

FIG. 7 is a view of a maintenance page of the software that user can drag first object pattern (carpet) to the location that they would like to see on the environment (living room).

This figure shows a page view of the software when user drags the first created object pattern (carpet) on the environment image (living room).

Every parts of the FIG. 7 which are numbered and defined as below;
21: view of the object pattern (carpet) while user dragging the object pattern (carpet) (while dragging edges of object pattern might be displayed as dashed lines or as original edges of object pattern—these type of design concern details may change based on a client and/or user requirements)
22: the direction of dragged object pattern example (carpet) (arrow shows the movement)

Figure 8:
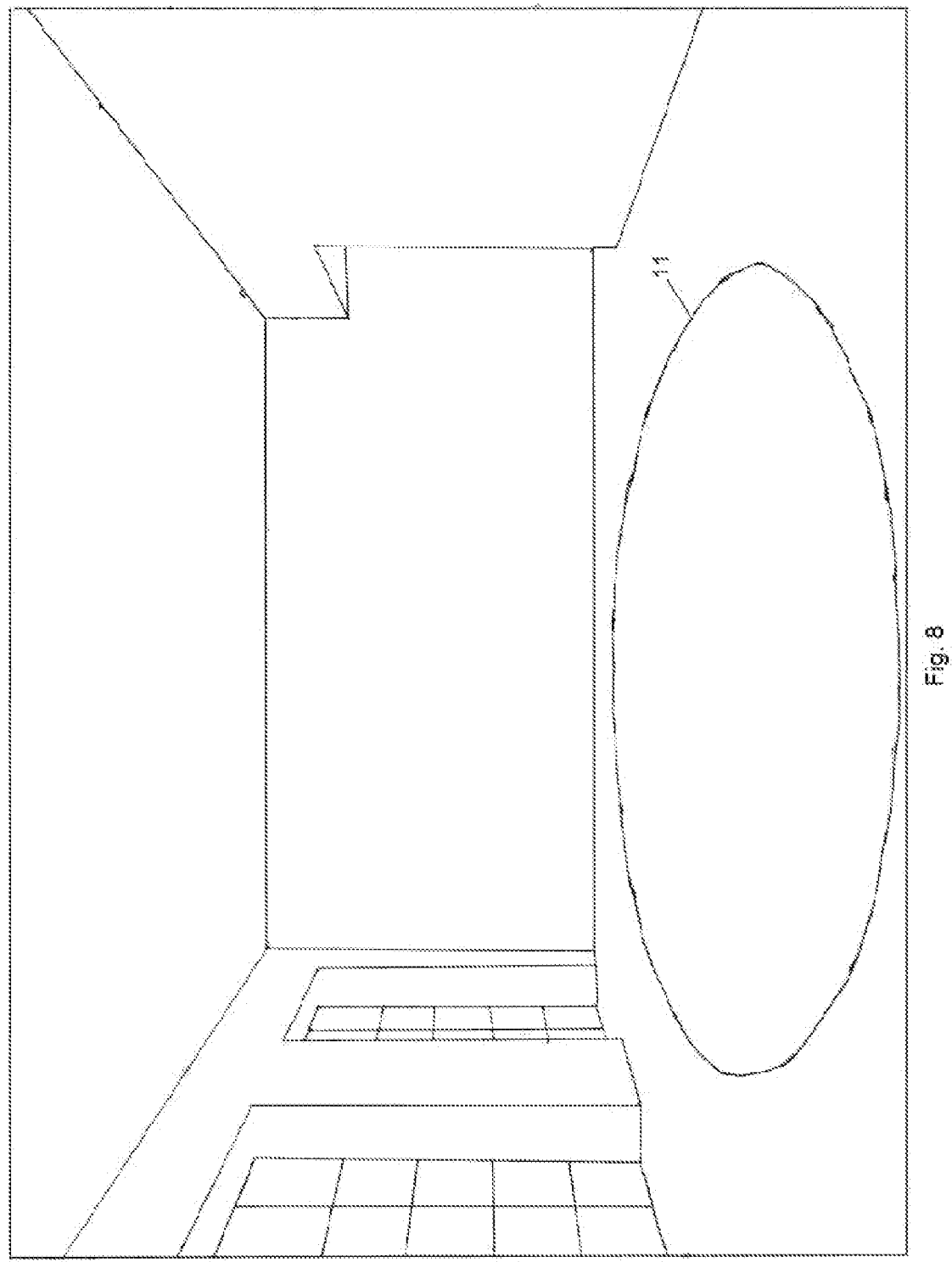

FIG. 8 is a view of a maintenance page of the software after user dragged the first object pattern (carpet) to the wanted location on the environment image (living room).

This figure shows a page view of the software after user dragged the first created object pattern (carpet) to the location on the environment image that the user will like to try and see this object (carpet) in his/her living room.

Figure 9:
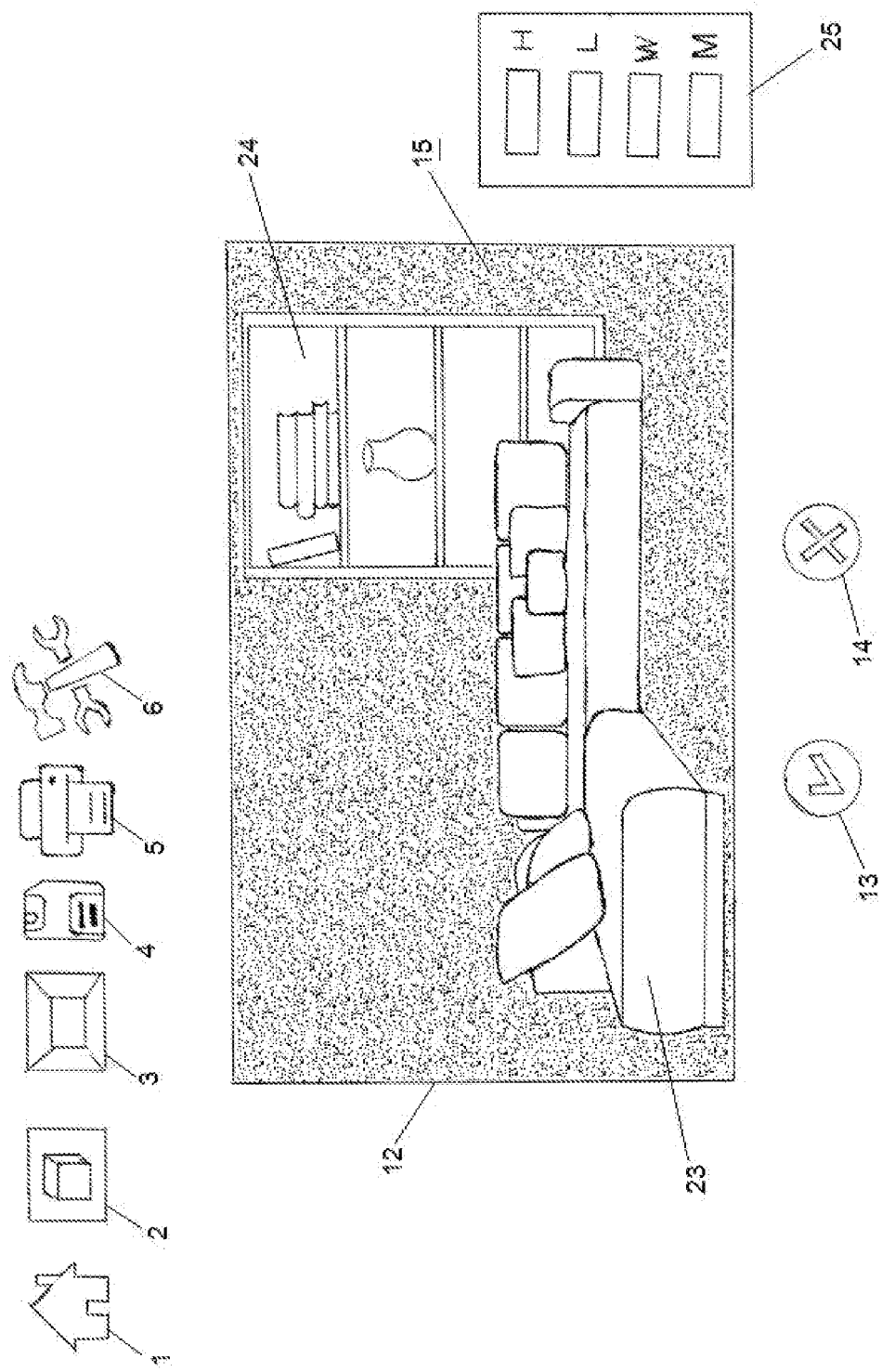

FIG. 9 is a view of the software page which shows an object image (for second object—users' wants to try a sofa) which has been automatically processed by software to create an object pattern. This image has unwanted objects (library and objects inside of library which are unwanted objects by user) along with wanted object (sofa).

This figure shows a page view of the software while software processing an uploaded, second object image to create an object pattern. Just because the software does not know which object wanted by user or unwanted, it automatically processes to confirm with user.

Figure 10:
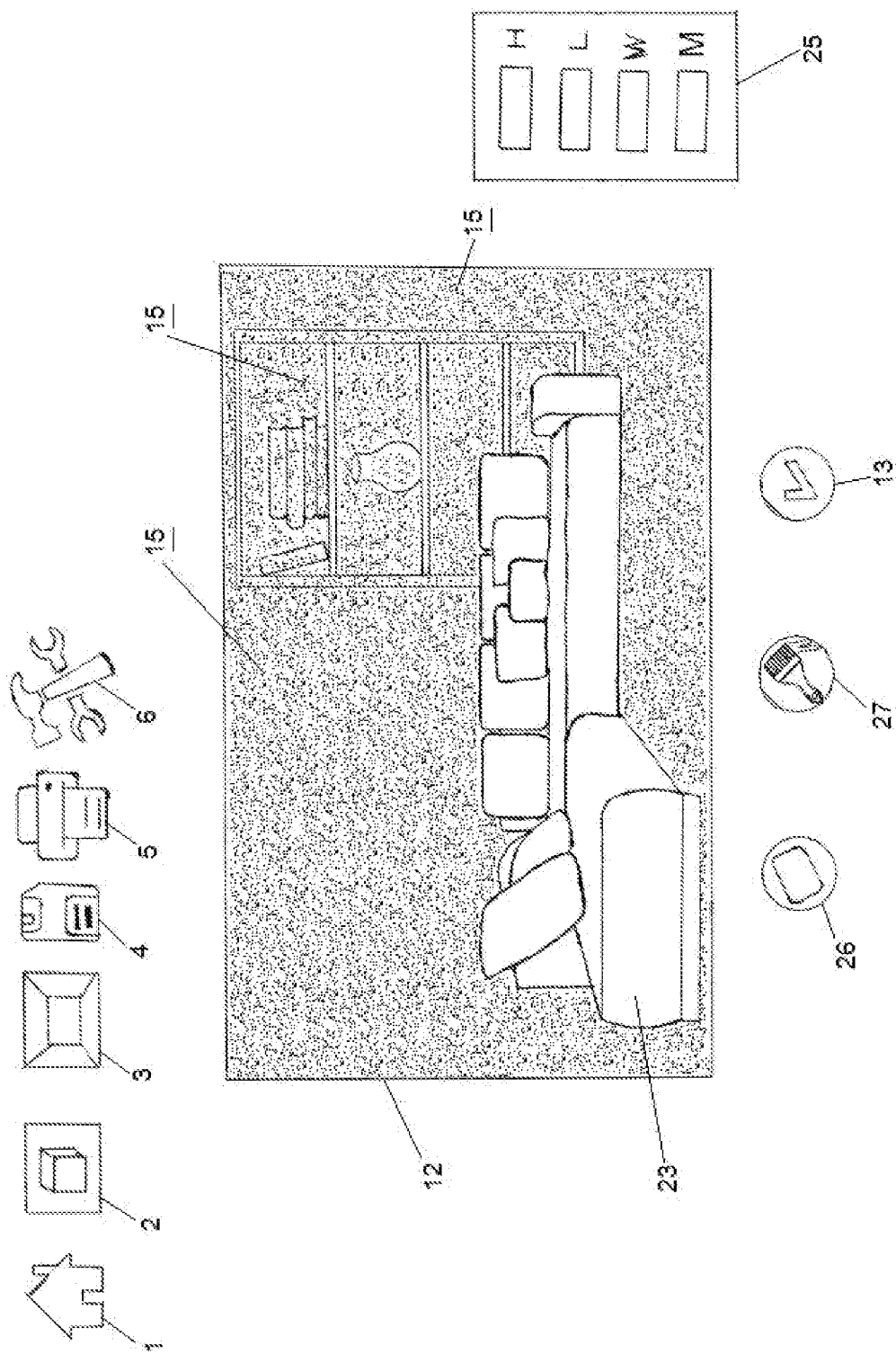

Every parts of the FIG. 9 which are numbered and defined as below;
23: second object pattern (sofa/sectional)
24: unwanted objects (library and objects inside of this library)
25: object image measurement and memo data entry section FIG. 10 is a view of the software page which shows a processed object image that has been modified by user to keep only wanted objects (based on user's desire) after an object image automatically processed by software on FIG. 9 to create an object pattern. An automatically processed object image from FIG. 9 has been modified by user to clear out unwanted objects (library and objects inside of library) by using tools on this page.

This figure shows how user modified the processed object image from FIG. 9 to create an object pattern (for sofa—wanted object).

Every parts of the FIG. 10 which are numbered defined as below;
26: eraser button (to create wanted area (for object pattern) if the software by error creates a surface 15 on a wanted area (object pattern))
27: paint button (to create unwanted area (surface 15))

Figure 11:
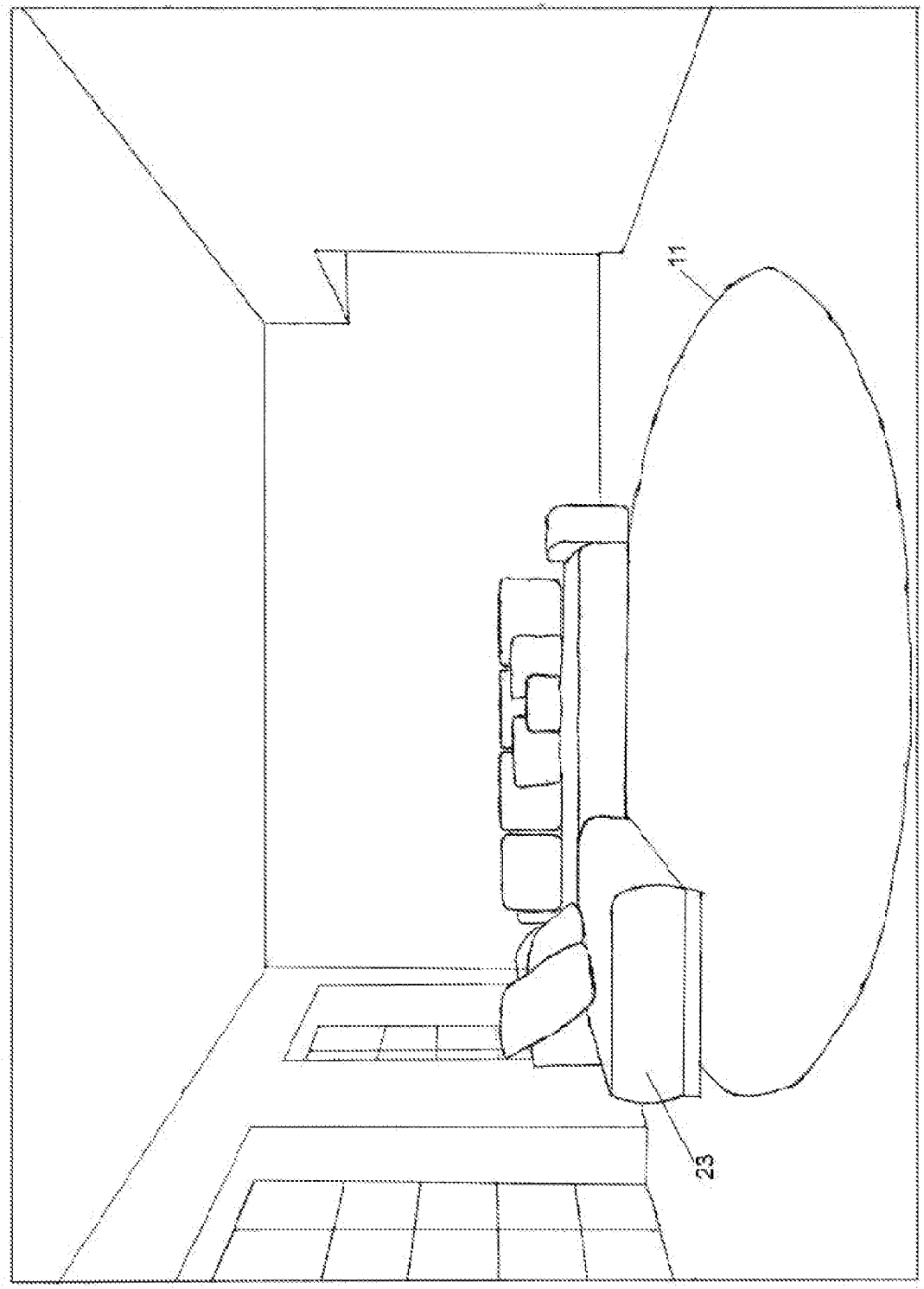

FIG. 11 is a view of the maintenance page after software dropped a second object pattern (sofa) and this object pattern has been dragged, located by user to the location that user would like to see in the environment (living room). (User goes through same steps as it has been explained on FIG. 6, 7, 8 that is why same process have not shown on drawings for sofa and will not be shown for next object pattern/patterns to not to mention same steps again and again)

Figure 12:
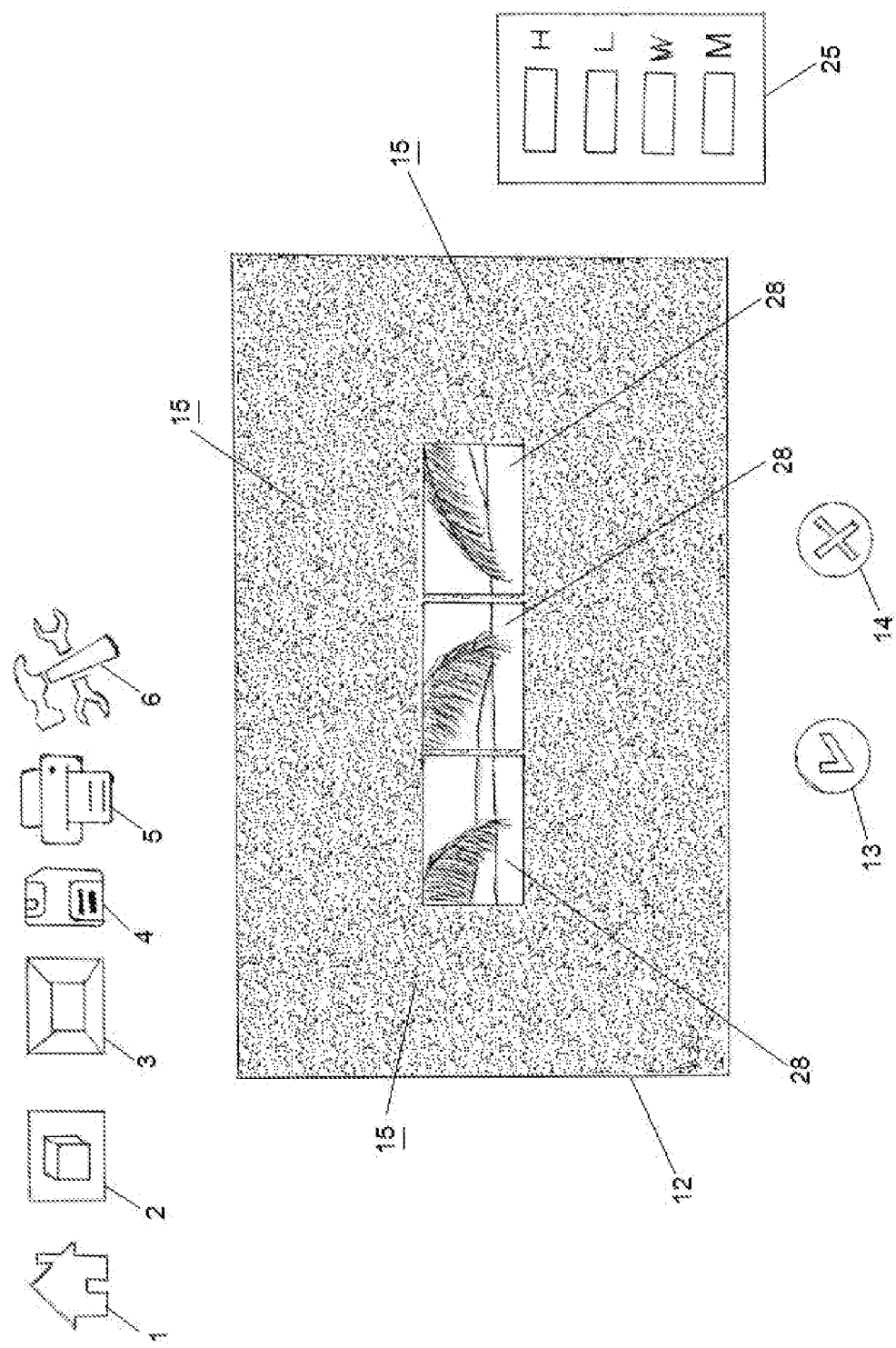

FIG. 12 is a view of a page of the software which shows an object image (third object—a wall art) that has been automatically processed by software to create an object pattern.

Every parts of the FIG. 12 which are numbered defined as below;
28: third object pattern (a wall art)

Figure 13:
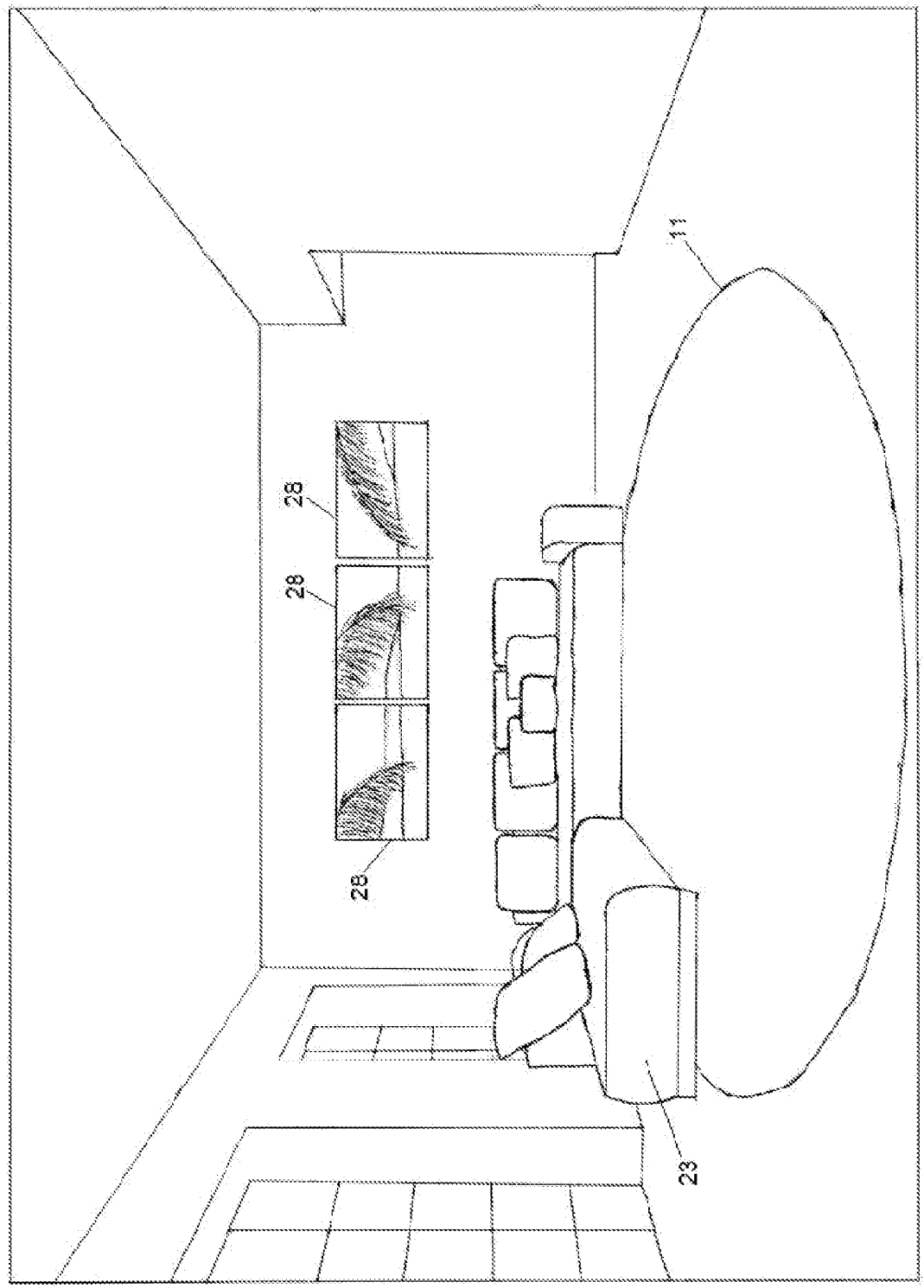

FIG. 13 is a view of the software maintenance page after software dropped a third object pattern (a wall art) and this object pattern has been dragged, located by user to the location that user would like to see in the environment (living room).

Figure 14:
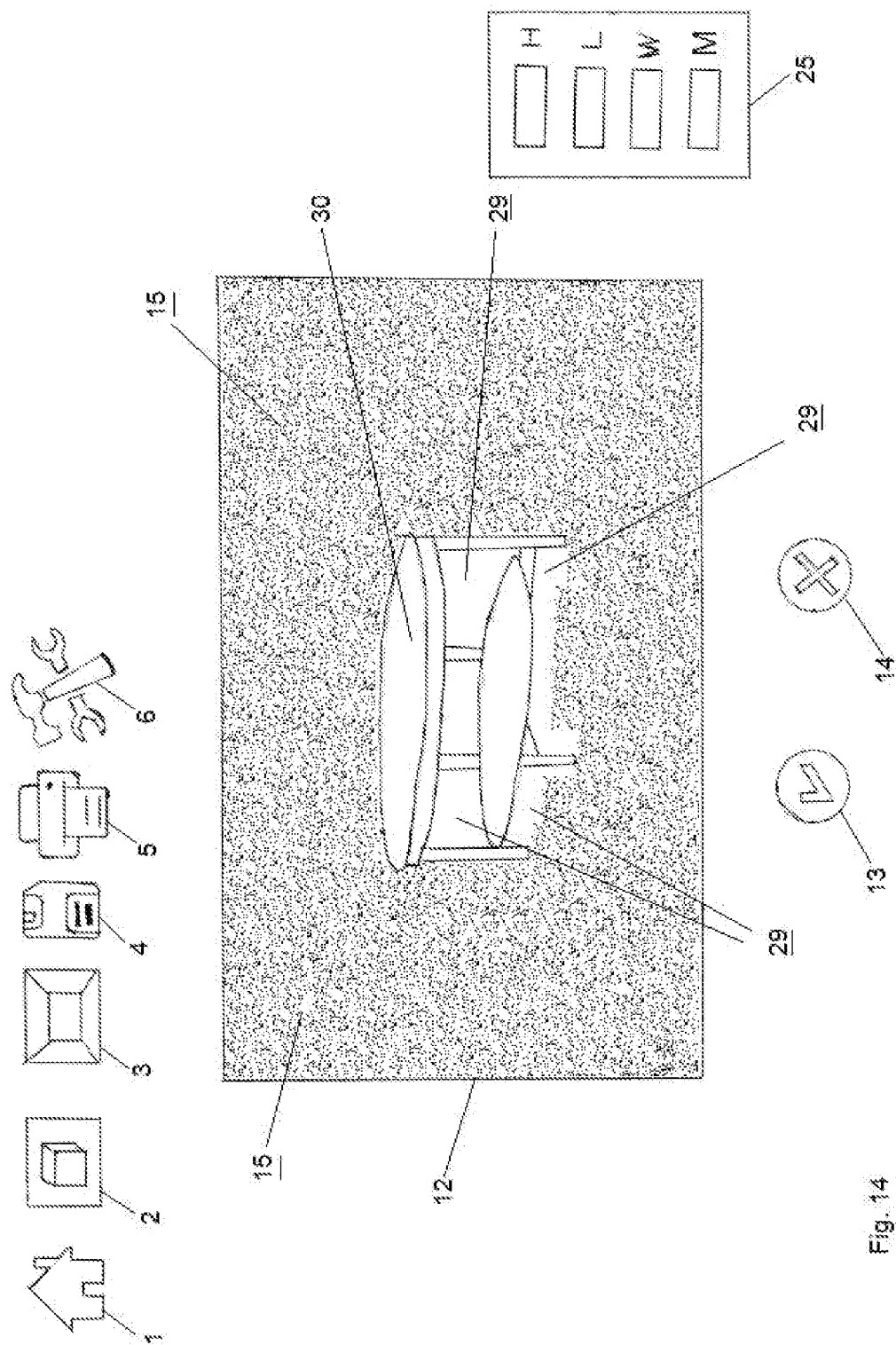

FIG. 14 is a view of the software page which shows an object image (forth object—coffee table) that has been automatically processed by the software to create an object pattern. Though this object may have too many similar color and shades with surrounding area that software may need a little help of user to identify unwanted areas.

Every parts of the FIG. 14 which are numbered defined as below;
29: areas that user does not want to keep which software could not automatically process these areas and these areas have been left over around of an object pattern 30: forth object pattern (coffee table)

Figure 15:
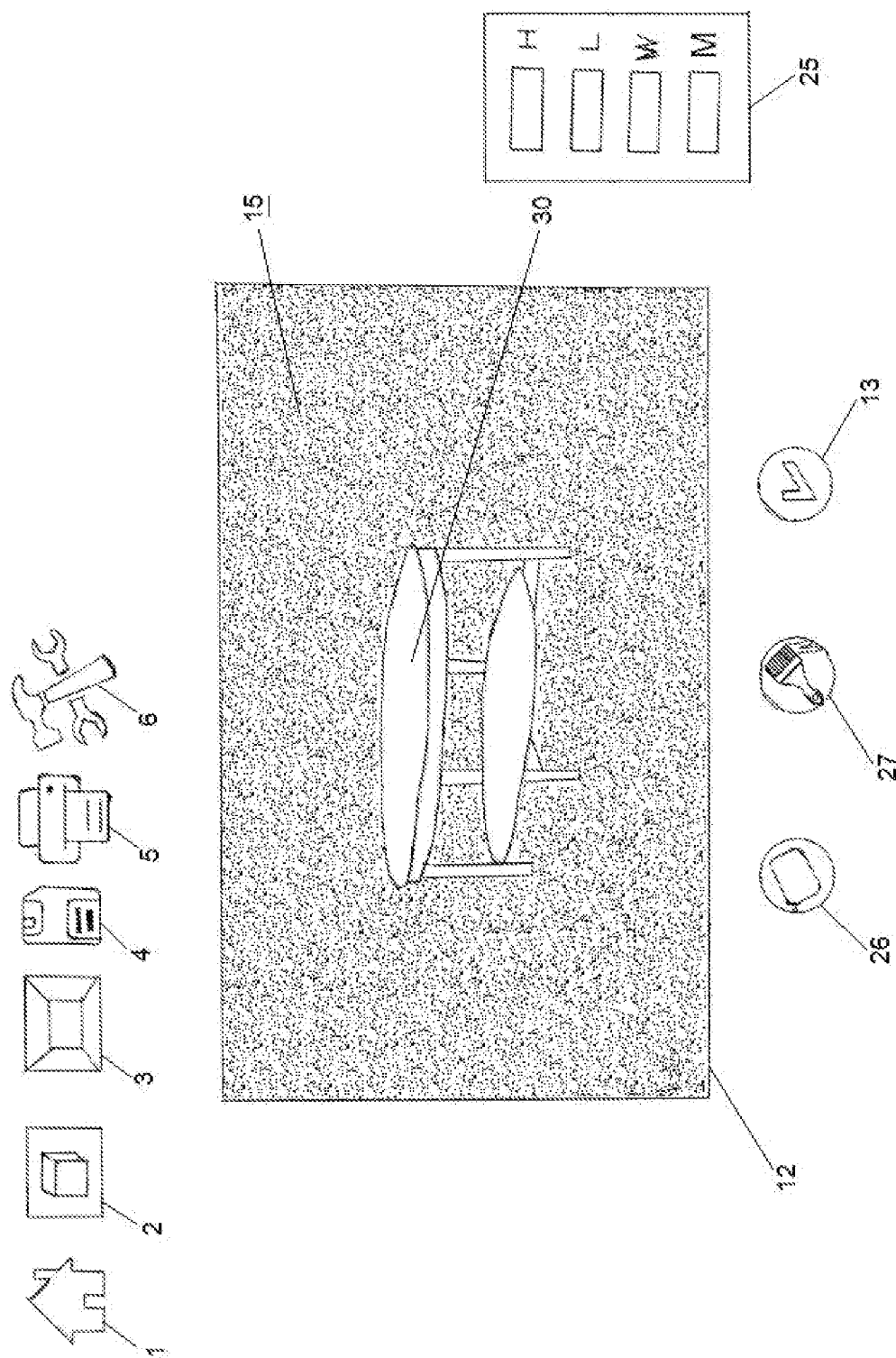

FIG. 15 is a view of the software page which shows a modified version of the automatically processed object image from FIG. 14 (forth object—coffee table) to create an object pattern by the help of user to fulfill user's experience while trying wanted objects in the chosen environment (living room).

Figure 16:
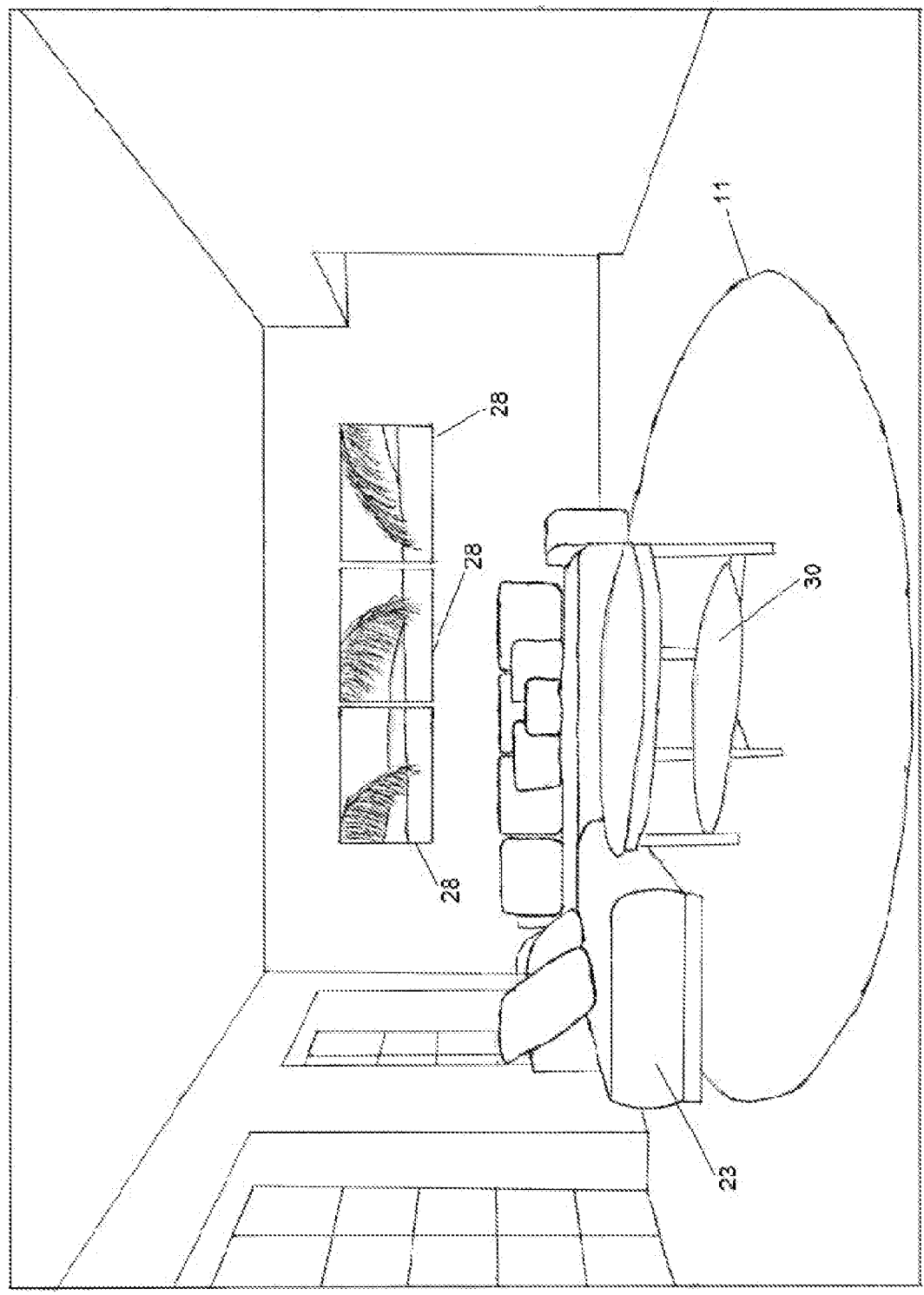

FIG. 16 is a view of the software maintenance page after software dropped a forth object pattern (coffee table) and this object pattern has been dragged, located by user to the location that user would like to see in the environment (living room).

Figure 17:
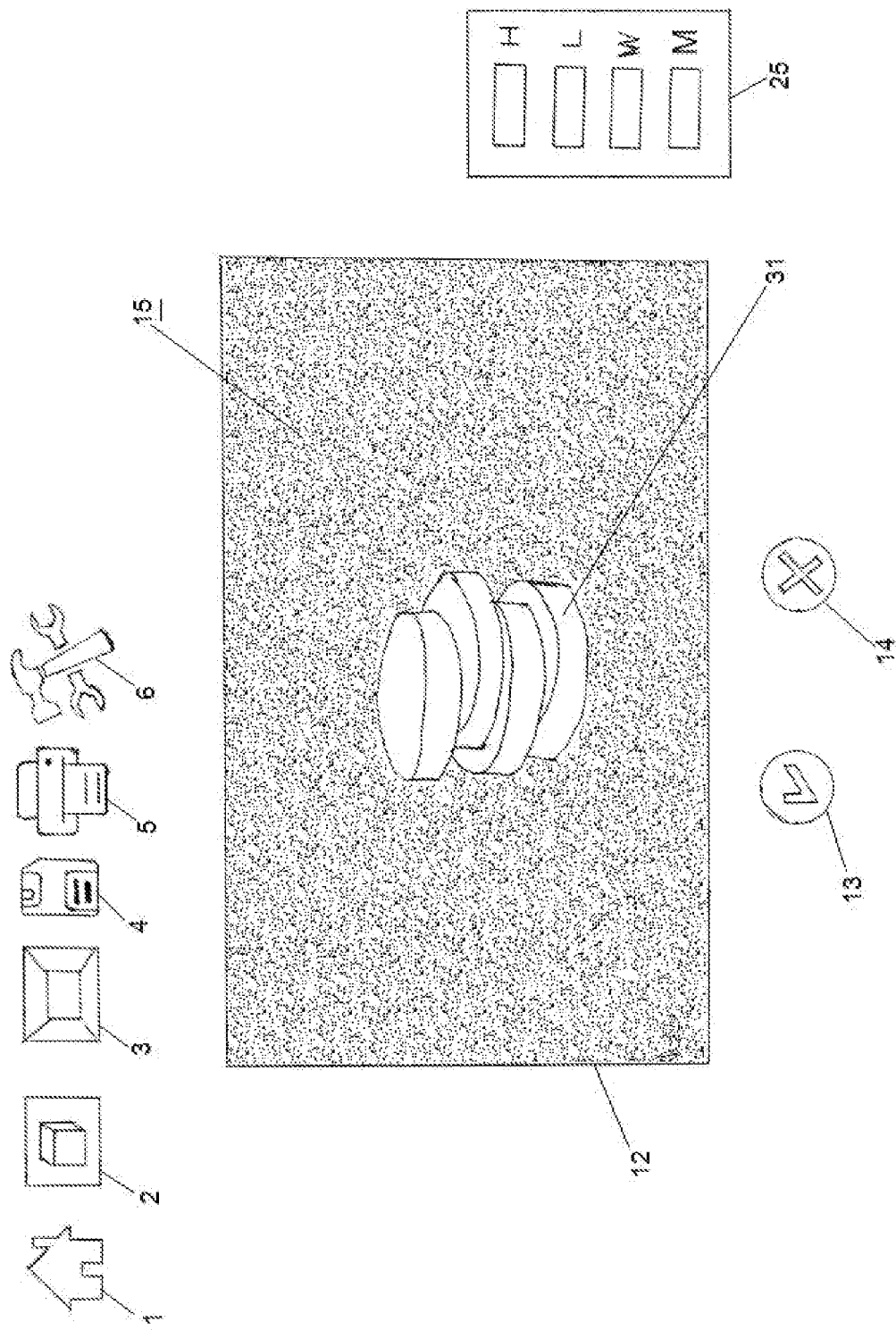

FIG. 17 is a view of the software page which shows an object image (fifth object—floor pillow set) that has been automatically processed by software to create an object pattern.

Every parts of the FIG. 17 which are numbered defined as below;
31: fifth object pattern (floor pillow set)

Figure 18:
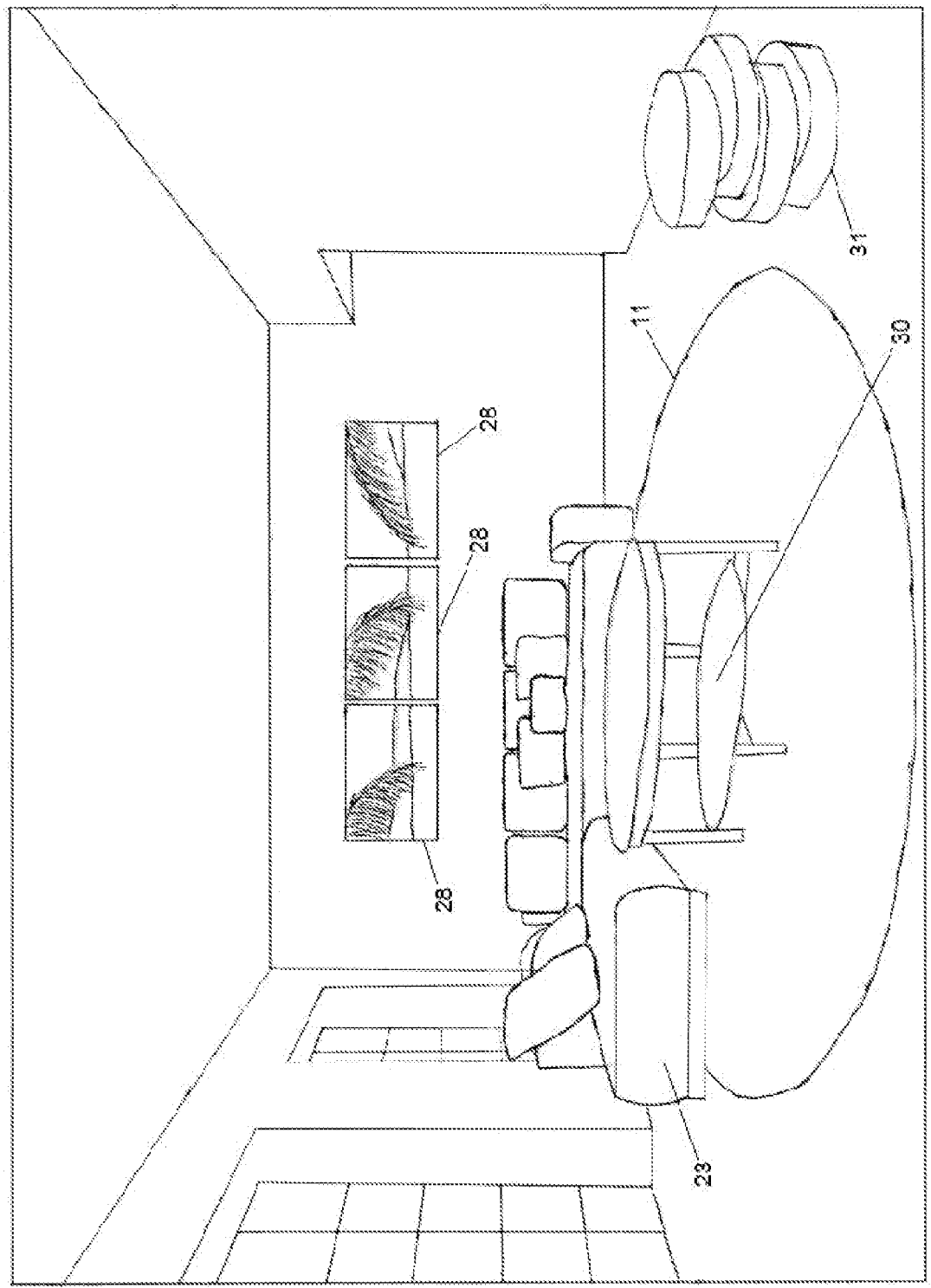

FIG. 18 is a view of the software maintenance page after software dropped a fifth object pattern (floor pillow set) and after this object pattern has been dragged, located by user to the location that user would like to see in the environment (living room).

FIG. 19 is a view of 3d rotated of an object image (first object image—for a carpet) in coordinates of x 70 degree, y 40 degree and z 70 degree (it has been rotated to explain and show process steps of creating object pattern more clear)

FIG. 20 is a view of 3d rotated of a processed object image (first processed object image—for a carpet) in coordinates of x 70 degree, y 40 degree and z 70 degree (it has been rotated to explain and show process steps of creating object pattern more clear)

FIG. 21 is a view of 3d rotated of an object pattern (first object pattern—carpet) in coordinates of x 70 degree, y 40 degree and z 70 degree (it has been rotated to explain and show process steps of creating object pattern more clear)

FIG. 22 is a complete view of a way the software creates an object pattern which happens in case of creating the software function to clear/remove a background of an image/picture or creating a transparent view for the background of an image/picture. An object image, processed object image and object pattern has been 3d rotated in coordinates of x 70 degree, y 40 degree and z 70 degree to show how software functions layer by layer while creating an object pattern (this has been displayed in that way for this specification by thinking showing the steps, layer by layer will make everything more clear in the specification)

Every parts of the FIG. 22 which are numbered defined as below;
32: work flow of the process step by step in the direction of arrow FIG. 23 is a view of 3d rotated an environment image (living room) in coordinates of x 70 degree, y 40 degree and z 70 degree (it has been rotated to explain and show process steps of applying an object pattern to an environment image)

FIG. 24 is a view of 3d rotated maintenance page (after object pattern-carpet has been applied to an environment image-living room) in coordinates of x 70 degree, y 40 degree and z 70 degree (it has been rotated to explain and show process steps of applying an object pattern to an environment image)

Figure 25:
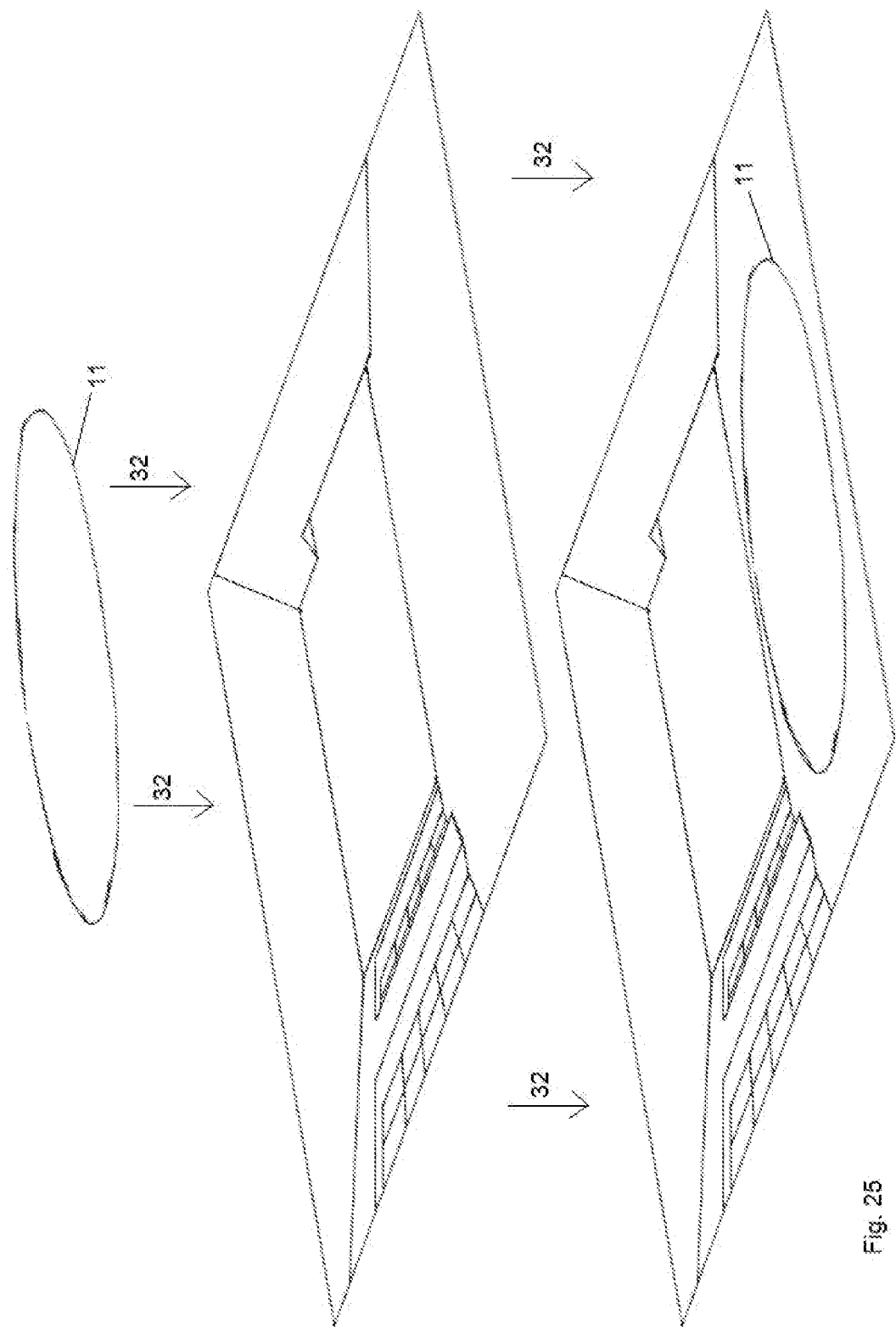

FIG. 25 is a complete view of a way the software applies an object pattern to an environment image to display an object (carpet) on environment image (living room). As mentioned; an object pattern, an environment image and result image (maintenance page of the software) has been 3d rotated in coordinates of x 70 degree, y 40 degree and z 70 degree to show how software functions, layer by layer to apply an object pattern to an environment image (this has been displayed in this way for this specification by thinking showing the steps, layer by layer will make everything more clear in the specification)

Figure 26:
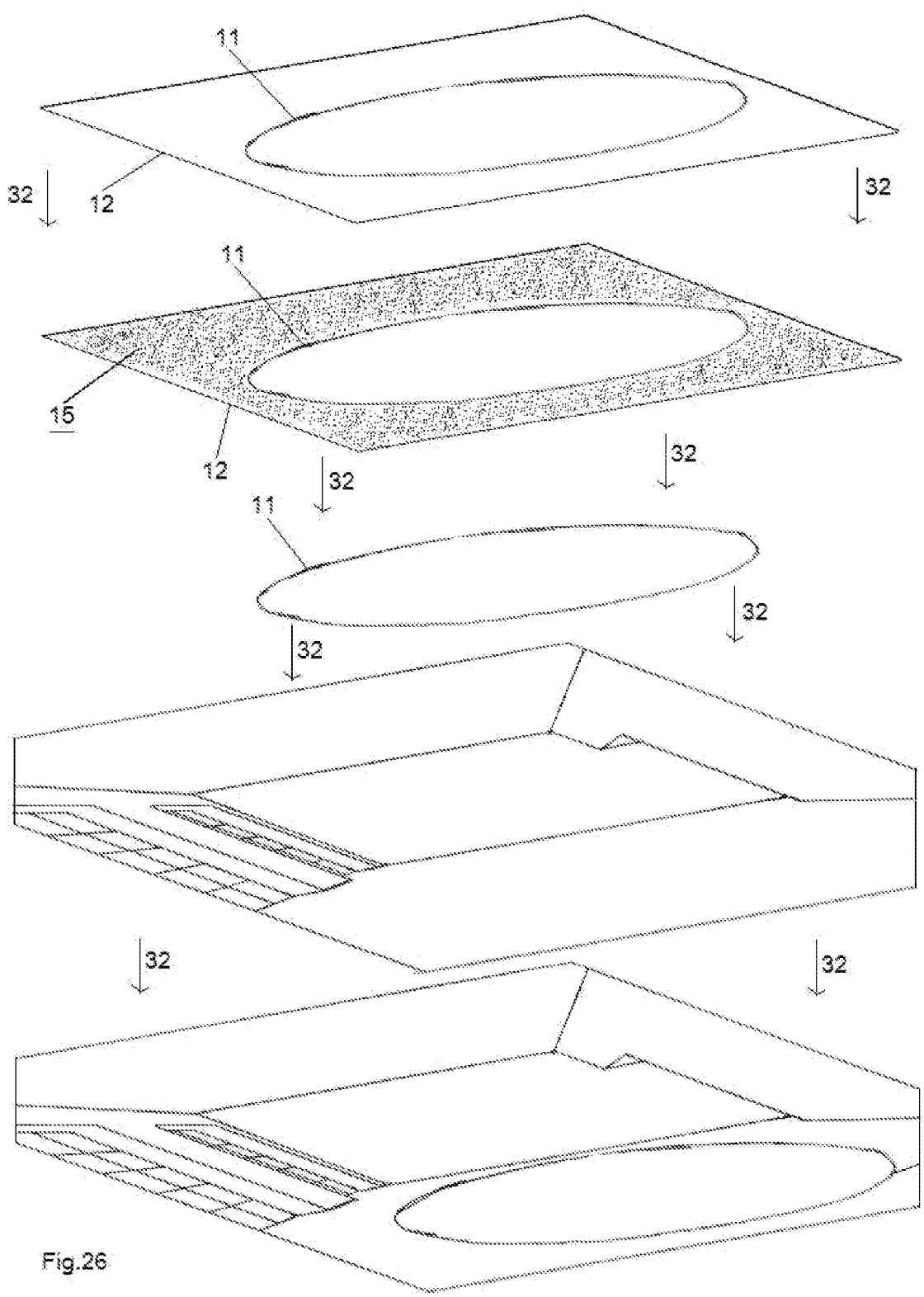

FIG. 26 which is the cover page of drawings section and it represents a summary of how the present invention functions to "digitally try any object in any environment" step by step. Process work flow starts with an object image (FIG. 19), ends with the result image as it can be followed by process work flow 32. All these parts have been mentioned previously, this figure is a collective display of functionality for the present invention.

FIG. 27 is view of a maintenance page of the software to show and explain how software displays an object and/or objects in a chosen environment based on their measurements to make user understand how much area a chosen object or objects may hold/cover in a chosen environment.

Every parts of the FIG. 27 which are numbered defined as below;
33: Auto measurement arrangement direction of the software for object pattern, based on a measurement ratio of the maintenance page
34: A measurement scale of the maintenance page in x coordinates
35: A measurement scale of the maintenance page in y coordinates

DETAILED DESCRIPTION OF THE INVENTION

The present invention is a software concept which users can try any object in any environment digitally. A workflow structure of creating an object pattern (on FIG. 22) and then applying an object pattern to an environment image (on FIG. 25) have been shown in separate drawings which are both together give a digital trying experience function to the software by creating object pattern in a way user wants then applying this pattern to an environment image. By this software concept many applications can be created with the demand of clients. To show how the present invention (software concept) functions, it will be explained through "an example software design". Main structures of the software concept are creating object pattern/patterns from object images and then applying these object patterns (carpet pattern, sofa pattern, hair extension pattern, accessory pattern and so on) to an environment image such as garden picture/image, living room picture/image and so on. Since there is no limitation for the type of an object that can be tried and applied to any environment, there is no limitation for the industry to use this software concept.

Step by step to show how a present invention works, it will be explained through an example software with drawings. To make everything clear, regarding to the software concept (present invention), specifically it will be explained by giving an example of a user experience. As an example model, user who needs to design her empty living room will be imagined and functionality of the software concept will be explained through this example.

When this model user starts to use the software concept, first thing user needs to do is uploading a picture or taking picture of the object (directly through the software) which user wants to see how this object will look like in her living room. In same way, based on preference, user can upload or take a picture of living room (environment image).

This user preferred to take a picture of a carpet that she liked in one of the merchant store. She opened the software and clicked on 2 (FIG. 1) that will bring FIG. 1 which displays option 7 and 8. By clicking on button 7, she will be able to take a carpet picture (object image) directly through the software or by clicking on button 8, she will be able to upload a carpet image which she had already taken and was in her camera library or in her computer files. She preferred to click on button 7 which directed the page to a camera window as FIG. 2 that shows 9 (camera of the software) in this window, she will be able to see the object and click on 10 when she takes a picture of a carpet, as usual camera functions.

After she clicks on 10, the software will display FIG. 3. At this stage the software is getting started the first step of creating an object pattern from an object image. This is an automatic processing that the software will show which part of a taken picture may be a wanted object that user will try. On FIG. 3, 12 represents complete object image window which contains 11—object pattern (carpet pattern) and 15 unwanted areas of this object image. These unwanted areas might be the floor around this carpet. As mentioned, this automatic processing occurs on this stage and on FIG. 3 user needs to make a decision if software shows all unwanted areas with transparent coloring to differentiate unwanted areas from the object pattern. If everything in automatic processing took place in a way user wants then a user needs to click on 13. As it displays from FIG. 3, around of carpet has a transparent color shade automatically and user clicks on 13 to confirm.

After first object pattern has been created, next step for this user to choose an environment image. She wants to see new objects (furniture and so on) in her empty living room and she clicks on button 3 from top menu of the software. This brings FIG. 4 that she can make a choice to take a picture of the environment or upload already existing environment image from her library/files. User choose to click on 17, which lets her to pick an image from her library or folders (when she clicks on 17 and then the software brings a pop-up window which shows her library and folders (this step as usual as it occurs in any software, basic image uploading process)).

After user choose her living room image from her library or folders, FIG. 5 displays an uploaded living room image and if everything looks good, user can click on 19 to continue and if not, user has option to click on button 3 again (software will ask if user wants to save this environment image or delete permanently at the time of clicking 3 again) to choose another environment image. This user preferred to continue with an uploaded living room image. Also user can enter measurement data (to section 20) of a displayed environment to see object/objects in a proper size compare to an environment otherwise user can scale the object pattern by herself by holding and dragging from corner lines. On FIG. 5, 18 is a maintenance window (software assigns directly at the time a user choose the environment image) which will be basically an environment to try any object that user wants to see in a chosen environment.

After an environment image (living room) has been uploaded and confirmed (by clicking on 19), the software applies created object pattern from FIG. 3 to the maintenance window 18 by dropping to any location on 18 as it displays on FIG. 6. User has flexibility to drag this object pattern (carpet) to a wanted location on the living room. As it has been shown on FIG. 7. User starts to drag an object pattern—carpet (by clicking on pattern and then dragging) in the direction of 22, and just to show this process on drawing, 11 has been shown as 21 (dashed line) to emphasize the moment of a dragging process of an object pattern.

After dragging 11, relocated 11 will look like as FIG. 8.

Then this user see a sofa sectional in one of the merchant store and directly takes a picture of this sectional sofa through the software (FIG. 1, 2 will be repeated for sofa also that is why same process have not mentioned again). FIG. 9 shows an auto processing stage of the software in an object image window (12). Software do not decide which object is wanted and instead leave this decision to a user after auto processing step. On FIG. 9 the present invention created an object pattern which includes both a sectional sofa and library (including books, accessories inside). User only liked a sectional sofa and decided to choose an object pattern which only will include a sectional sofa to try on her living room. To be able to accomplish that she clicks on 14. Then by clicking on 14, the software directs user to a page for a modification that she can use tools like 27 to cover up library area (will be unwanted area). FIG. 10 shows modified version of an automatically processed object image after user applied 27 by clicking on 27 and then clicking on few areas on the library which she does not want to see. When user clicked on the library portion, that area will start to have same transparent color as area 15. After unwanted area has been covered with this transparent color as it is shown on FIG. 10 (on drawing it had to be shown as shaded area), user click on 13 to confirm choosing this object pattern (a sectional sofa). Also if she wants to enter measurement for this sectional sofa before clicking 13, she can enter the measurement data to 25 (based on a client request, section 25, can be customized as it is demanded).

FIG. 11 is the maintenance window view after a sectional sofa pattern has been dropped by the software and dragged by user to the wanted location on the living room image. (Top menu of the software which was showing 1, 2, 3, 4, 5, and 6 has been removed only on "drawings" for this specification of a maintenance window after FIG. 7. This is needed to show a maintenance window better (bigger scale) and display next object patterns in a clear format in a wider area).

Then this user likes a wall art on one of the online store and decides to try this object image on her living room image. FIG. 12 is the page after user followed same steps to upload the wall art to the software (clicked on 2 from top menu then clicked 8 to upload an object image) and then software auto processing has done. Since a transparent color covered the unwanted areas of this object image other than object pattern (wall art) as it will be viewed from window 12 on FIG. 12, a user clicks 13 to verify that everything correctly processed by the software. This action brings user to FIG. 13 which is a page view of a maintenance window after the software drops a created object pattern (wall art pattern) and user drags this wall art pattern to the wanted location on her living room image.

By following previous steps user uploads a coffee table image (object image) and the software creates a coffee table pattern on FIG. 14 (auto processing step). Since the software did not cover all unwanted areas (color of coffee table might be too similar to the surrounding of this coffee table because of that the software may not realize the edges in between) some modification is needed to cover areas 29 on FIG. 14. User clicks on 14 to do some modifications and FIG. 15 shows modified version of an automatically processed object image which is the view after user clicked on 27 and then clicked on couple points on areas 29 as it was shown on FIG. 14 which turned areas 29 to a transparent color as 15. If she wants, she enters a measurement data to 25 and clicks on 13 to confirm. (If on coffee table, by error a transparent area (15) had occurred then user could click on 26 and click on these transparent areas on the coffee table which would be the process to clean transparent coloring on coffee table. This did not occur in this example that is why tool 26 have not been used and mentioned specifically.)

As object patterns can be dragged on the maintenance window, they are also sizable by clicking corners of the object pattern and then dragging to make them smaller or bigger. This occurs incase user does not want to use camera measurement that has been shown in FIG. 2 which is the measurement line build in camera display window. User has option to enable or disable it by clicking on the measurement line on the camera, each click will show if it has been enabled or disabled. When it comes to measurement, user has three option; first one is that user can choose to have no measurement and may want to see the way how objects visually look like and they can size them small and big as much as they want, second one user can use the measurement of built in camera window to let the software measure both an object and environment in case built in camera is used, third one is that the software gives an option to a user to enter the measurement data to the tables 20 for an environment image and 25 for an object image. Even at the beginning user does not want to enter a measurement data or use built in camera measurement and ignore these features, this user can enter after a while by basically using the measurement tables for each object. For object patterns on the maintenance window, a measurement table will be displayed only an object pattern clicked.

If we return to our example, to user's experience, she tried a coffee table and the present invention is displayed FIG. 16 which has a coffee table (object pattern) inside. Then by looking to the digitally last shape of her room, she decides that digitally designed living room could look better with a floor pillow set, on the right corner of the living room. After she looks at some online stores, she finds a floor pillow set, which might look good on her living room and she goes to the software after saving the image of the floor pillow into her library, then again repeat the steps on FIG. 1 and clicks 8 to upload object image from her files/library. After a floor pillow set image has been uploaded, auto processing is being completed on FIG. 17 and user clicks 13 to verify that other than object pattern 31, rest of the area has been covered by transparent color (surface 15, area between borders of 12 and 31 for FIG. 17). Then finally user can review last shape of her living room with all wanted objects (11, 23, 28, 30, and 31). By using the present invention, user could experience digitally how wanted objects may look like in her living room before purchasing, logistics or assembly of any of the objects.

The present invention gives users to have flexibility of trying any object on any environment digitally so users can decide if she/he will like the way all wanted objects will look like while user plan to purchase for her/his living room rather than imagining.

This software concept may give users to have a comfort of deciding on objects/items/products before going through purchase, logistics and assembly also gives flexibility of deciding on right location of objects in the environment.

Since this software concept allows user to try any object on any environment, it covers many industry products. Just as an example we can think of construction, fashion, entertainment (any created pattern can be applied to any environment so it can be used in social media to create custom patterns to apply on any wanted image).

Software can be designed in a way as it has been explained in this example software design or in many different way as client requests. What makes this invention so unique is the functional structure as work flow has been shown on FIG. 22 and FIG. 25.

To be able to explain and clarify how the present invention functions, a taken picture of carpet (object image) from FIG. 2, auto processed image of carpet from FIG. 3 and object pattern 11 has been 3d rotated in the x direction 70 degree, y direction 40 degree and z direction 70 degree. In this way we will be able to clarify the process flow to create object pattern by showing layer by layer.

As we know any picture we took not only comes with what we want to see actually but with other objects and surrounding area. To leave only what we want to try as an object, the present invention creates an object pattern by giving an importance to users' decisions. FIG. 22 shows the process of creating an object pattern by keeping an area object image which user wants and removing an area on object image in a way a user wants and verifies.

On FIG. 22, as the process flow shows, the present invention first recognize and memorize a taken object image (carpet image) that has been shown on FIG. 19 then on the second step FIG. 20, it processes this object image and find out which area belongs to wanted object and displays it, the software gives a transparent color to unwanted areas (auto processing) (This transparent color might be colorless or such color like blue, green etc. which will make user experience easier). If the software could not recognize the areas correctly (sometimes shades and colors might to be too similar between objects and surrounding of the object on same image) or user may want to display only one object (in case if there are too many objects in same object image) user can do correction by using tools 26, 27 as it has been explained previously. Third step, FIG. 21 comes after confirmation of a user and it is a completed shape of an object pattern (in this example a carpet pattern).

FIG. 25 shows "the process of applying a created object pattern (FIG. 21) to a chosen environment image (FIG. 23)". This step is basically applying a created object pattern on an environment image. In this way digital trying experience becomes the reality.

To explain how objects will be displayed on an environment image based on their measurements, compare to an environment. We need to use the measurement comparison ratio between an object pattern and an environment image. As mentioned previously there was two ways to provide measurements to the software which was either using built in camera measurement tool or by using measurement table to enter known (by user) measurement data. Either way after the software receives the measurement data for an object and an environment. The software will change the display size of the object pattern inside of the software by comparing the measurement of an object to an environment. It means that the present invention will take the measurement of an environment (the part which displays on environment image) as a reference measurement and use this measurement of an environment image like an invisible measuring window (on the related coordinates) and based on that, the software will process the object pattern in a way to shrink or enlarge (auto process).

As an example, the software received the measurement data of an environment (the portion which displays on image) on the x axis (width) 18 ft. and on y axis (height) 16.5 ft. as it has been shown on FIG. 27 (if an image can be uploaded as 3d image then z axis should be considered). Because of an environment image and object which will be in 2 dimension on this example, only 2 dimensions will be mentioned. The software will use this environment image as 18 ft to 16.5 ft. measurement chart by dividing x axis to the 18 equal portions and dividing y axis to the 16.5 equal portions (this chart will be invisible to users, only the software will use it for itself for processing) also will make an adjustment for inches measurement by dividing each portion to 12 portions. Since the measurement chart has been arranged by ratio of the measurement of environment image, based on metric system if a data given by user is meter then each m portion will be dived in 10 portion to emphasize cm measurement. Main and most used metric systems will be built inside of the software to make arrangements and lead users. As we continue to explain this feature with this example, an object has a measurement of width 10 ft. (x axis) and height 5 ft. (y axis). Based on this data, the software will shrink or enlarge the object pattern both in x and y axis. Basically the software will make decision on x axis of object pattern to understand if x axis value is same size as 10 ft length of the measurement chart of the environment image of x axis. If not then it will shrink or enlarge the same scale of 10 ft of measurement chart of the environment image. Then it will make similar decision for y axis to see if y axis of object pattern is as same size as 5 ft. height of the measurement chart of the environment image of y axis. If not then it will shrink or enlarge the same scale of 5 ft. of the measurement chart of the environment image. On FIG. 27 as per example given, it has been seen that x axis of an object pattern-carpet is more than 10 portion measurement as comparison to x axis of the environment image x axis that is why it has to shrink till x axis of object pattern is equal to 10 portion of environment image x axis. In same way y axis of object pattern will be arranged in y axis. After the software making arrangements on measurement ratio of object pattern compare to the environment image, the software apply this object pattern on the environment image as it has been explained previously. Measurement arrangement is completely a choice of a user and if user wants to use this tool, they will not only see how the chosen object looks like on the chosen environment, they will also see how big or small this object will look like in the environment. Sometimes when we are doing shopping in a store, it might be easier to understand as a size how objects will look like in our living room or any environment that we want to use because we can see the object physically but it may not be easy to quite understand when we are shopping online. That is why this feature of the present invention (the software) will make a difference to understand how objects will look like as per their size in a chosen environment.

The present invention is a software concept and as long as technical logic as mentioned on FIG. 22, FIG. 25 both together applied into a software concept, many different applications can be created with different versions as per client requests as it has been mentioned in this specification.

The invention claimed is:

1. A computerized method for digitally trying any object in any environment comprising the steps of:
receiving an object image data by uploading an object image using an object upload button or taking a picture of the object using an object capture button through a user interface;
processing this object image data to automatically create an object pattern;
displaying an approval button and a rejection button to the user through the user interface;
receiving an approval or a rejection for the object pattern that has been automatically created using the approval button or the rejection button;
providing editing tools to the user through the user interface upon selection of the rejection button to allow the user to reevaluate and edit the automatically processed object pattern until the user finalizes the object pattern by selecting the approval button through the user interface;
after finalizing the object pattern, receiving an environment image data by uploading an environment image using an environment upload button or taking a picture of the environment using an environment capture button through the user interface;
inserting the environment image data into a maintenance window of the user interface;
applying the finalized object pattern onto the maintenance window of the user interface for the user to drag, resize, and rotate the finalized object pattern and rotate a merged image of the environment image and the finalized object pattern referred as a result image of the maintenance window;
selecting an object image button through the user interface to digitally try more than one object in the environment image; window; and
selecting an environment image button through the user interface to digitally try the object in a different environment image.

2. The computerized method of claim 1, further comprising entering measurement data for the captured or uploaded environment image data and the captured or uploaded object image data.

* * * * *